(12) United States Patent
Schugt et al.

(10) Patent No.: US 6,220,379 B1
(45) Date of Patent: *Apr. 24, 2001

(54) CART RETRIEVER VEHICLE

(75) Inventors: William Schugt, Mound; Stephan Dominguez, Minneapolis, both of MN (US)

(73) Assignee: Dane Industries, Inc., Plymouth, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/869,183

(22) Filed: Jun. 4, 1997

Related U.S. Application Data

(63) Continuation-in-part of application No. 08/600,627, filed on Feb. 13, 1996, now Pat. No. 5,934,694.

(51) Int. Cl.$^7$ .................................................. B62D 39/00

(52) U.S. Cl. ...................................... 180/65.1; 280/33.992

(58) Field of Search ..................................... 180/167, 65.1, 180/65.6, 15, 16, 907; 280/33.992

(56) References Cited

U.S. PATENT DOCUMENTS

| | | |
|---|---|---|
| 3,524,512 | 8/1970 | Voeks et al. . |
| 3,575,250 * | 4/1971 | Dykes ........................................ 180/11 |
| 4,093,900 * | 6/1978 | Plunkett ................................. 318/370 |
| 4,096,920 | 6/1978 | Heyn . |
| 4,586,584 * | 5/1986 | Auman et al. ........................ 180/271 |
| 4,771,840 | 9/1988 | Keller . |
| 4,993,507 * | 2/1991 | Ohkura ................................... 180/168 |
| 5,064,012 | 11/1991 | Losego . |
| 5,082,074 | 1/1992 | Fischer . |
| 5,109,566 * | 5/1992 | Kobayashi et al. ..................... 15/319 |
| 5,110,189 | 5/1992 | Haines . |
| 5,161,634 * | 11/1992 | Ichihara et al. ....................... 180/179 |
| 5,257,673 * | 11/1993 | Sato et al. ............................. 180/271 |
| 5,322,306 | 6/1994 | Coleman . |
| 5,439,069 * | 8/1995 | Beeler ...................................... 180/11 |
| 5,465,806 * | 11/1995 | Higasa et al. ......................... 180/165 |
| 5,524,588 * | 6/1996 | Dykstra et al. ....................... 180/179 |

(List continued on next page.)

FOREIGN PATENT DOCUMENTS

| | | |
|---|---|---|
| 23 50 308 A1 | 4/1975 | (DE) . |
| 24 50 692 A1 | 4/1976 | (DE) . |

*Primary Examiner*—J. J. Swann
*Assistant Examiner*—Michael Cuff
(74) *Attorney, Agent, or Firm*—Brinks Hofer Gilson & Lione; G. Peter Nichols

(57) ABSTRACT

A vehicle for retrieving wheeled shopping carts in parking lots. The vehicle is an electric-powered vehicle with electronic remote control which allows one operator to use the device for retrieval of the wheeled shopping carts. The vehicle can be operated in a remote or manual mode. The vehicle includes a cart coupling means for securing the wheeled shopping carts to the vehicle. The coupling means includes two arcuate jaw members which surround the rear tube frame members of the shopping cart. A locking rod is pushed across one jaw member to secure the shopping cart to the coupler assembly. When operating in the remote control, the operator guides the vehicle with a remote transmitter. The remote transmitter transmits signals using a pulse code modulation system. The signals use a 400 Mhz. carrier for digital signals. The vehicle can likewise be operated in a manual mode. The vehicle provides a foot pedal seat and steering wheel for manual operation. The electric drive means for powering the vehicle includes dynamic braking and a parking brake. A controller controls the electric drive means providing speed control to allow for dynamic load compensation. The parking brake is actuated automatically when the vehicle has come to a stop or released automatically when motion is sensed.

27 Claims, 16 Drawing Sheets

U.S. PATENT DOCUMENTS

| | | | |
|---|---|---|---|
| 5,571,999 | * | 11/1996 | Harris .................................. 200/565 |
| 5,592,883 | * | 1/1997 | Andress ............................ 104/88.03 |
| 5,680,308 | * | 10/1997 | Warren ................................ 180/233 |
| 5,743,347 | * | 4/1998 | Gingerich ............................ 180/65.1 |
| 5,769,051 | * | 6/1998 | Bayron et al. ........................ 180/167 |
| 5,783,989 | * | 7/1998 | Issa et al. .............................. 340/426 |
| 5,934,694 | * | 8/1999 | Schugt et al. ................... 280/33.991 |

* cited by examiner

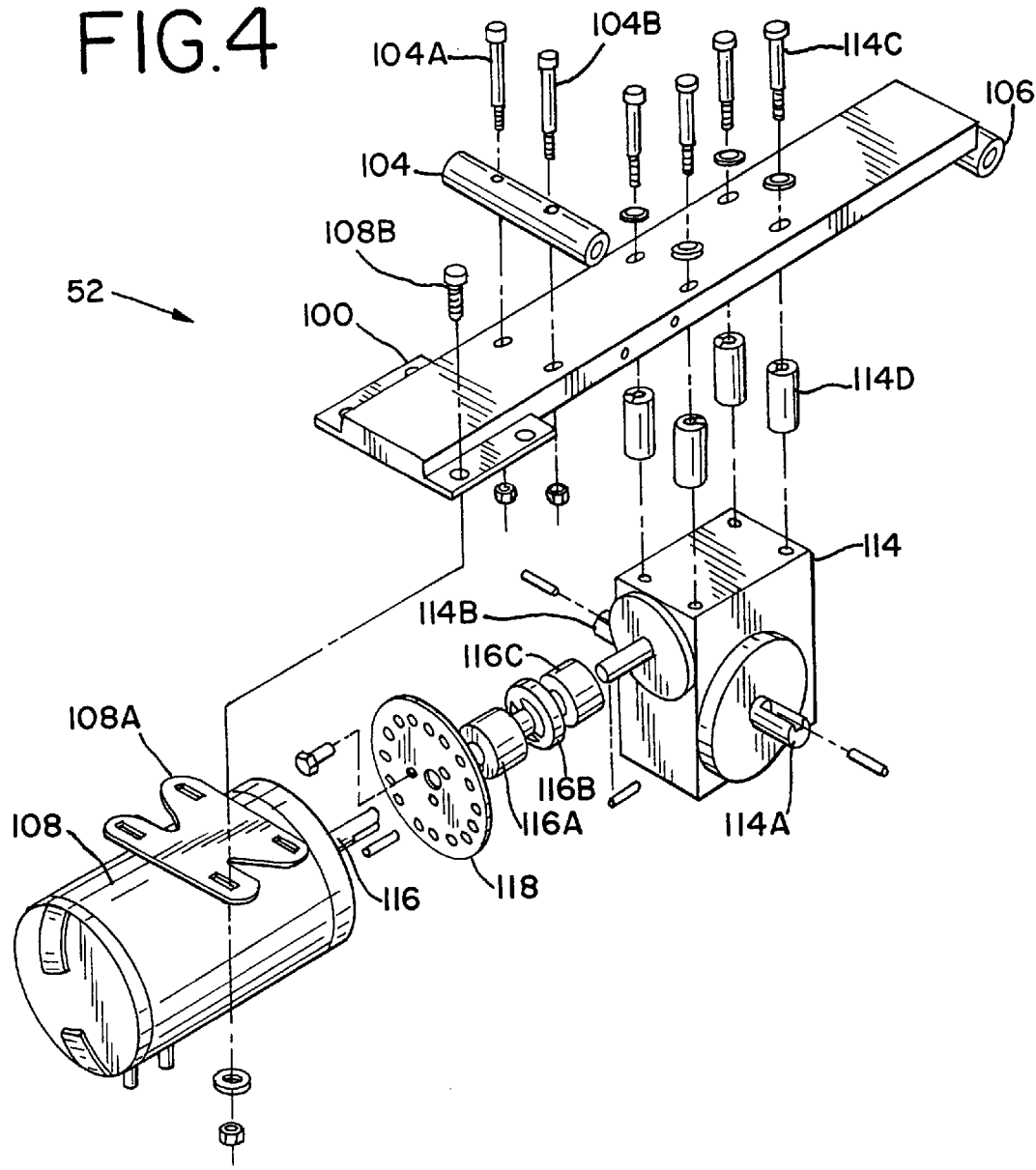

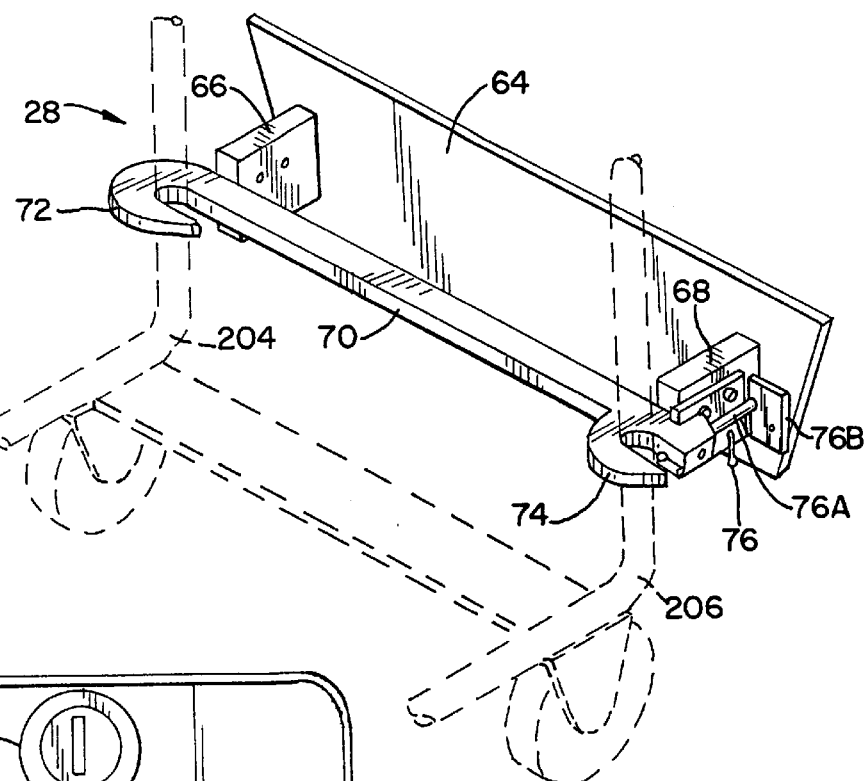
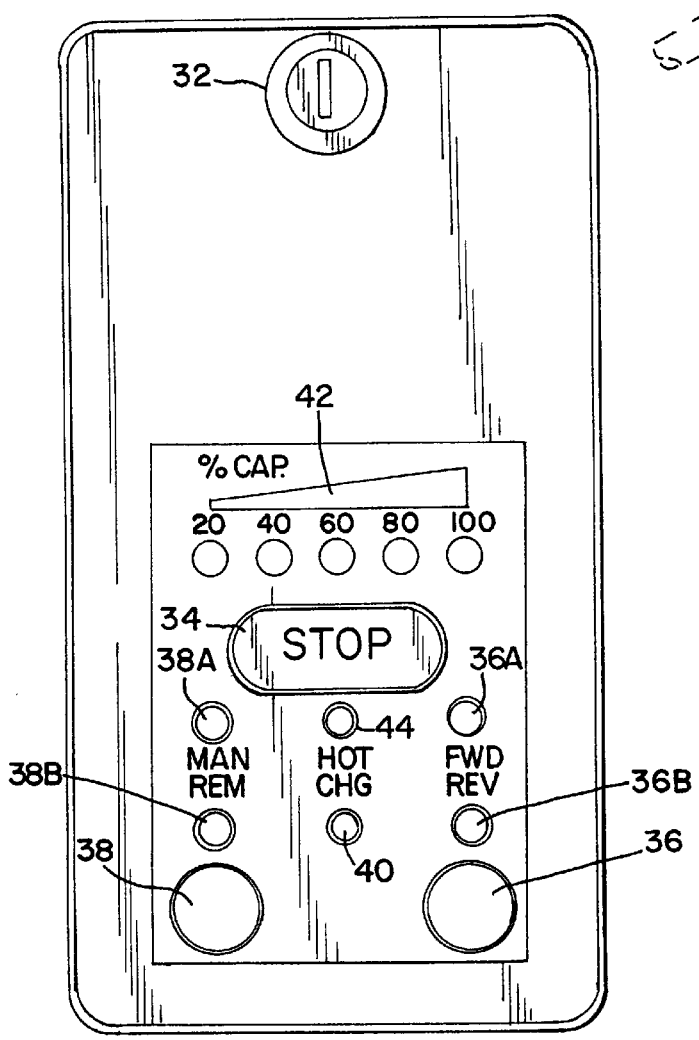

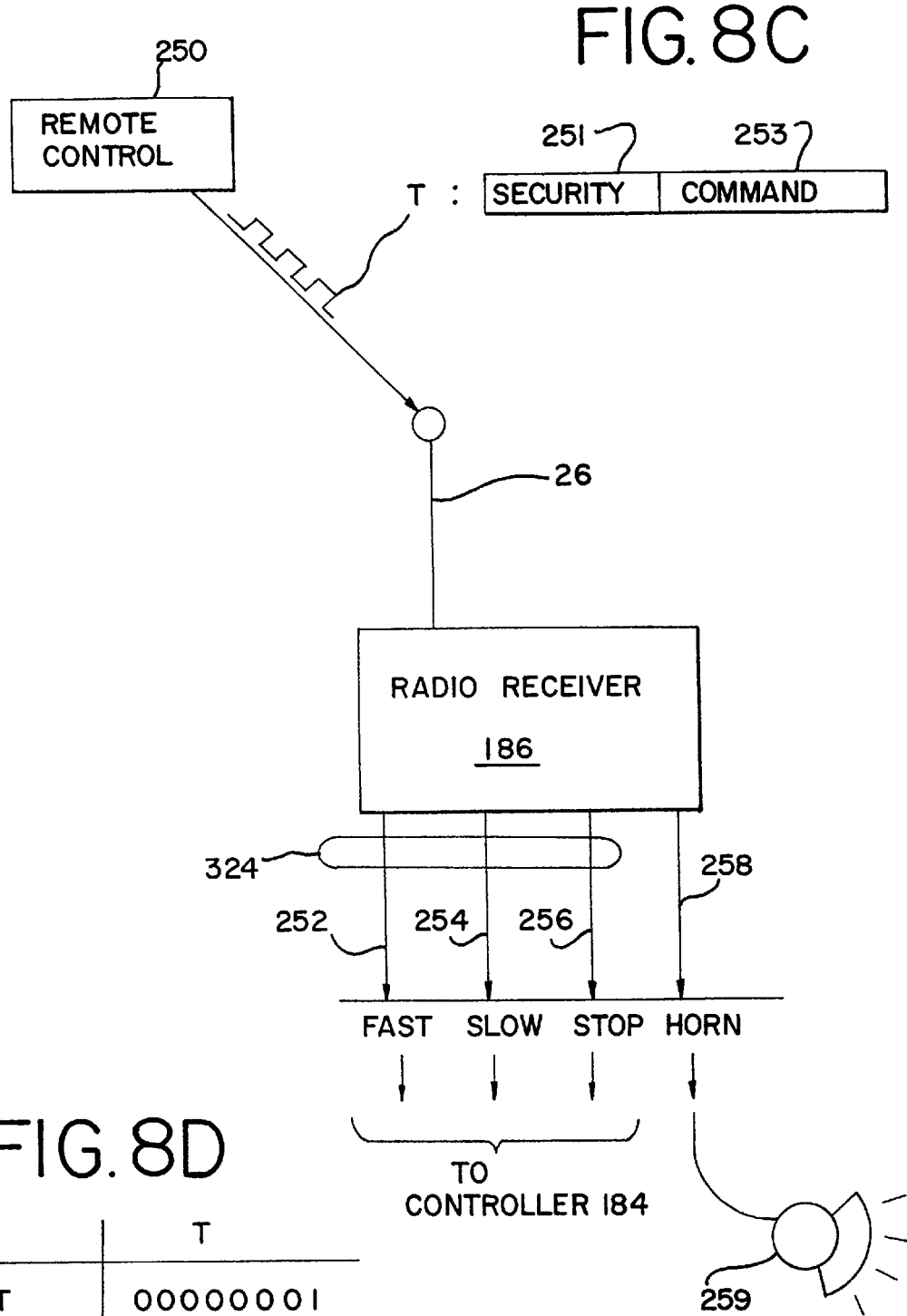

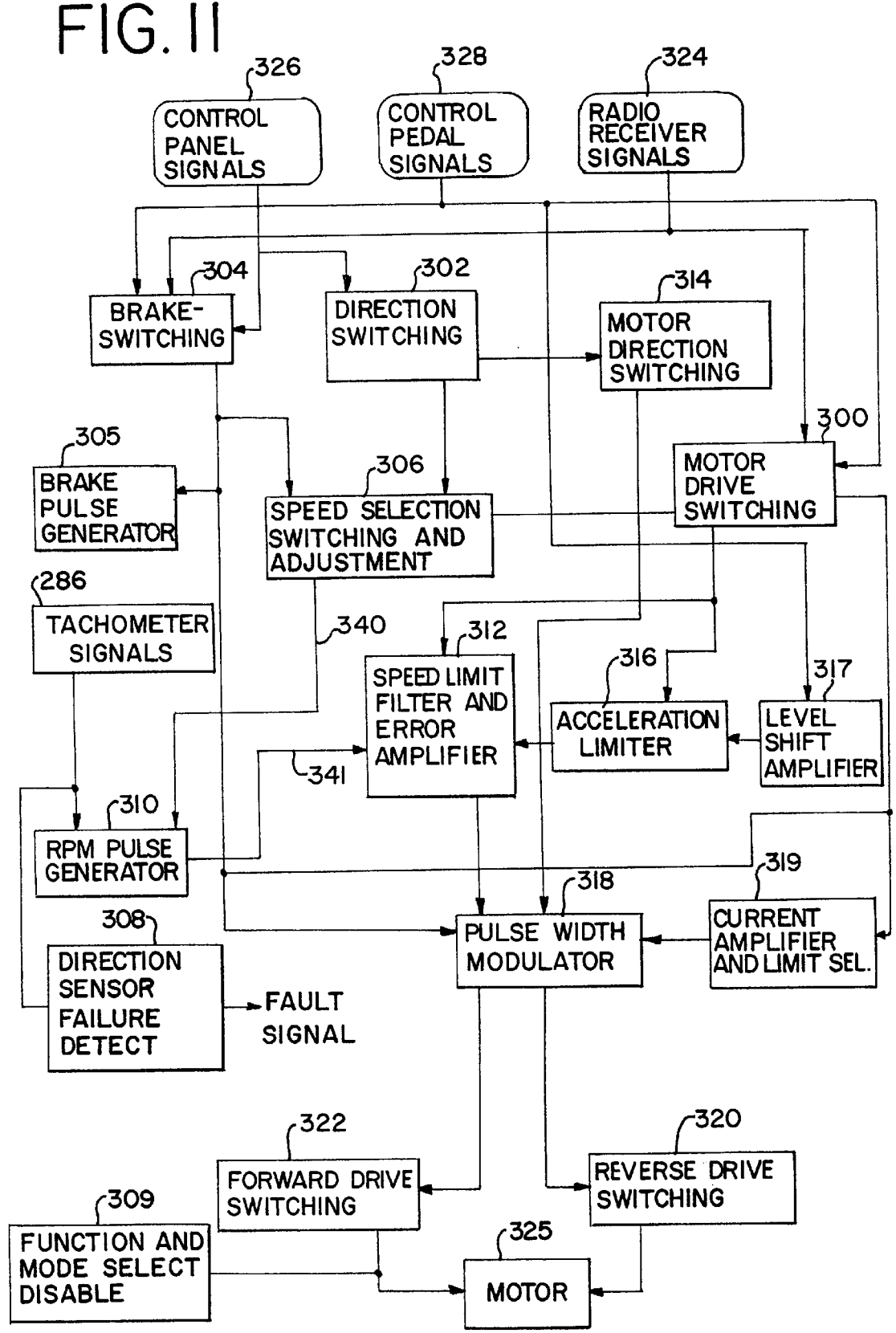

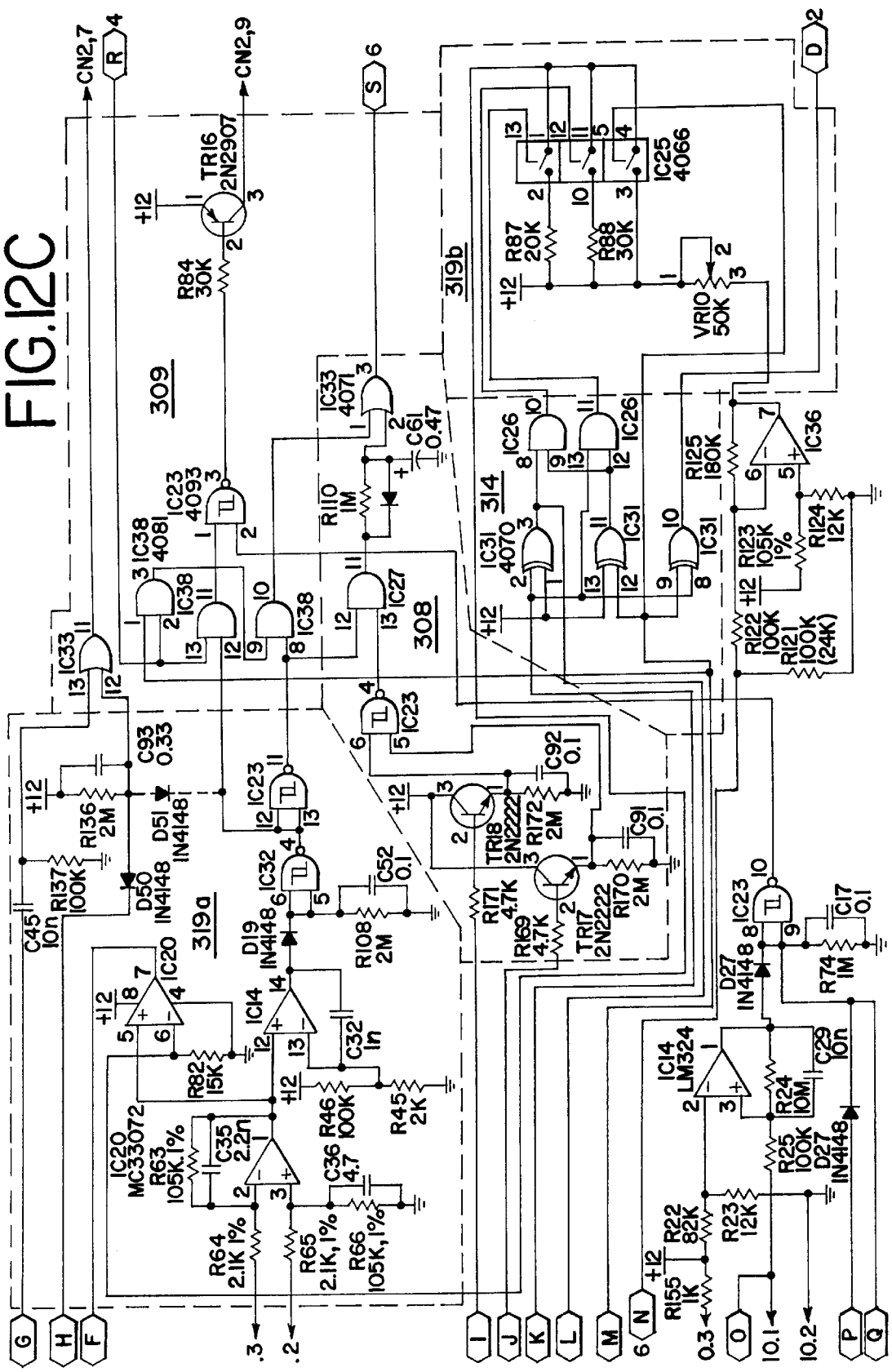

CART RETRIEVER VEHICLE

This is a continuation-in-part of application Ser. No. 08/600,627 filed on Feb. 13, 1996, now U.S. Pat. No. 5,934,694, issued Aug. 10, 1999, the entire contents of which are incorporated herein by reference.

FIELD OF THE INVENTION

This invention relates to a device designed to assist in the retrieval of wheeled shopping carts in parking lots and more particularly to an electric powered vehicle with an improved electronic controller that provides allowing one operator to use the device for retrieval of wheeled shopping carts.

DISCUSSION OF THE PRIOR ART

Retrieving shopping carts in large parking lots is primarily a manual task. Workers push or pull a column of stacked wheeled shopping carts from various collection areas located throughout large parking lots. The longer the column of carts being pushed or pulled, the more difficult it becomes to control. Thus, workers limit the number of carts. Even with more than one worker, the collecting and guiding of long columns of carts is difficult and time consuming. Furthermore, in large parking lots workers must push or pull the column of carts a great distance. The retrieval task can be physically exhausting and may result in injury to the workers. Carts also can be damaged as the workers struggle to push or pull long columns to the store door.

In response to the difficulties with manual retrieval of shopping carts, a prior art apparatus involves using a motorized device for pulling a column of shopping carts through the parking lot in a train-like fashion. A rope extends from the motorized device and is fastened to the last cart in the column of carts. Each time a cart is added to the column, the rope must be unfastened from the previous cart, extended further and then secured to the cart added at the end of the column. The operator walks alongside the motorized device as it pulls up to thirty-five carts. This prior art device requires operators at both ends of the column or requires the operator to run back and forth between the cart end of the column and the motorized device end of the column because operations occur at both ends of the column of carts. Additionally, the speed of the device is limited to a preset speed which can only be adjusted by programming the microprocessor controller in the device. When the carts are brought to the entrance of the store, the prior art device is difficult to maneuver inside the store. The carts must still be manually pushed or pulled into the store. This can be a difficult task if the column is quite long.

Therefore, what is needed is a cart retrieval system which allows operation by a single individual and eliminates the need for the individual to manually manipulate the long column of carts. The present invention addresses this concern by providing an electrically powered cart retrieval vehicle which can be operated by remote control.

SUMMARY OF THE INVENTION

The present invention is a vehicle for retrieving wheeled shopping carts in parking lots. The vehicle is an electric powered vehicle housing six 6-volt batteries in two parallel banks in the vehicle's chassis. An upper housing is hinged to the chassis and contains a seat for the operator, a steering wheel, a control console and an antenna pole. The vehicle can be operated in a remote or manual mode. When operated manually, the operator sits in the seat, controls the vehicle speed and direction with a foot pedal, the control console and the steering wheel. In the remote mode, a remote transmitter is used by the operator to control the speed and direction of the vehicle and column of carts secured to the vehicle. The operator then steers the column of carts at the end of the column opposite the vehicle.

The vehicle includes a cart coupler located on its front end which secures one shopping cart to the vehicle. The cart coupler contains a jaw bar having two arcuate jaw members which will surround the lower back tubular members of the shopping cart. The cart coupler additionally includes a locking pin on one jaw member which extends across the open portion of the jaw to lock the shopping cart tubular member to the arcuate jaw.

The vehicle includes a worm gear drive connected to the drive motor. The motor utilizes dynamic braking for stopping the vehicle. Additionally, an emergency or parking brake assembly is included in the drive assembly. The drive motor shaft includes a tachometer disc assembly which is used to determine the speed of the vehicle. The emergency or parking brake is activated by a solenoid with a core that is forced by a spring against a parking brake disc when the emergency brake is activated. The friction between the lever and the tachometer disc causes the braking action of the emergency brake.

A central controller is used to operate the vehicle. The central controller receives the operation signals from either the control console on the vehicle or the remote transmitter received by the vehicle via the antenna. The remote transmitter communicates the signals using pulse code modulation on a 400 Mhz signal that carries information in digital format. The controller extracts commands from the digital signal and sends an appropriate signal to the drive motor and brake motor. The central controller also receives a signal from the tachometer disc assembly regarding the speed of the vehicle. The controller uses pulse width modulation with speed and acceleration limiting circuits to provide load variation compensation capabilities.

The vehicle includes various safety features such as a rotating beacon at the top of the antenna pole, a brake light and reflective material stripes surrounding the vehicle. The vehicle may include optional features such as brackets for receiving weights to act as ballast, a trailer hitch and a refuse container located on top of the housing.

The primary object of the present invention is to provide a vehicle for retrieving wheeled shopping carts in large parking lots with the vehicle being operable in a remote control or manual mode thus eliminating the need for individual workers to manually manipulate the long column of carts.

Still another object of the present invention is to provide a rechargeable electric powered vehicle for retrieving wheeled shopping carts which is easily used in either a manual or remote control mode for retrieving long columns up to seventy-five shopping carts.

A further object of the present invention is to provide a shopping cart retrieval vehicle that maintains a desired speed under changing load conditions.

Another object of the present invention is to provide a shopping cart retrieval vehicle that operates by remote control using a communication system in which commands are contained in a signal transmitted over a wireless medium.

A further object of the present invention is to provide a shopping retrieval vehicle that incorporates a safety feature limiting the speed of the vehicle and having a controller which automatically limits the top output rpm of the drive motor at a predetermined speed.

Another object of the present invention is to provide a vehicle which is easily driven and steered by an operator sitting on the vehicle when operating in the manual mode or when the operator is located at the opposite end of the column of carts from the vehicle when operating in the remote control mode.

A further object of the present invention is to provide a vehicle for retrieving wheeled shopping carts which can operate in all types of weather conditions including snow, sleet, rain and ice and which can push up to seventy-five carts.

DESCRIPTION OF THE DRAWINGS

The foregoing features, objects and advantages of the invention will become apparent to those skilled in the art from the following detailed description when considered in connection with the accompanying drawings, in which like reference numerals designate like parts throughout the Figures thereof and wherein:

FIG. 4 is an exploded perspective view of the drive assembly of the present invention;

FIG. 6 is a perspective view of the cart coupler assembly of the present invention;

FIG. 7 is a top view of the console controller of the present invention;

FIG. 8C illustrates one embodiment of the PCM communication between the hand-held remote control transmitter and the signal receiver of the present invention;

FIG. 8D is a table of commands and corresponding signal word values for one embodiment of the codes used in the PCM communication of FIG. 8C;

FIG. 11 is a block diagram of one embodiment of the controller of the present invention; and FIGS. 12A–F is a schematic representation of the controller in FIG. 11.

DESCRIPTION OF THE PREFERRED EMBODIMENT

Figure 1:
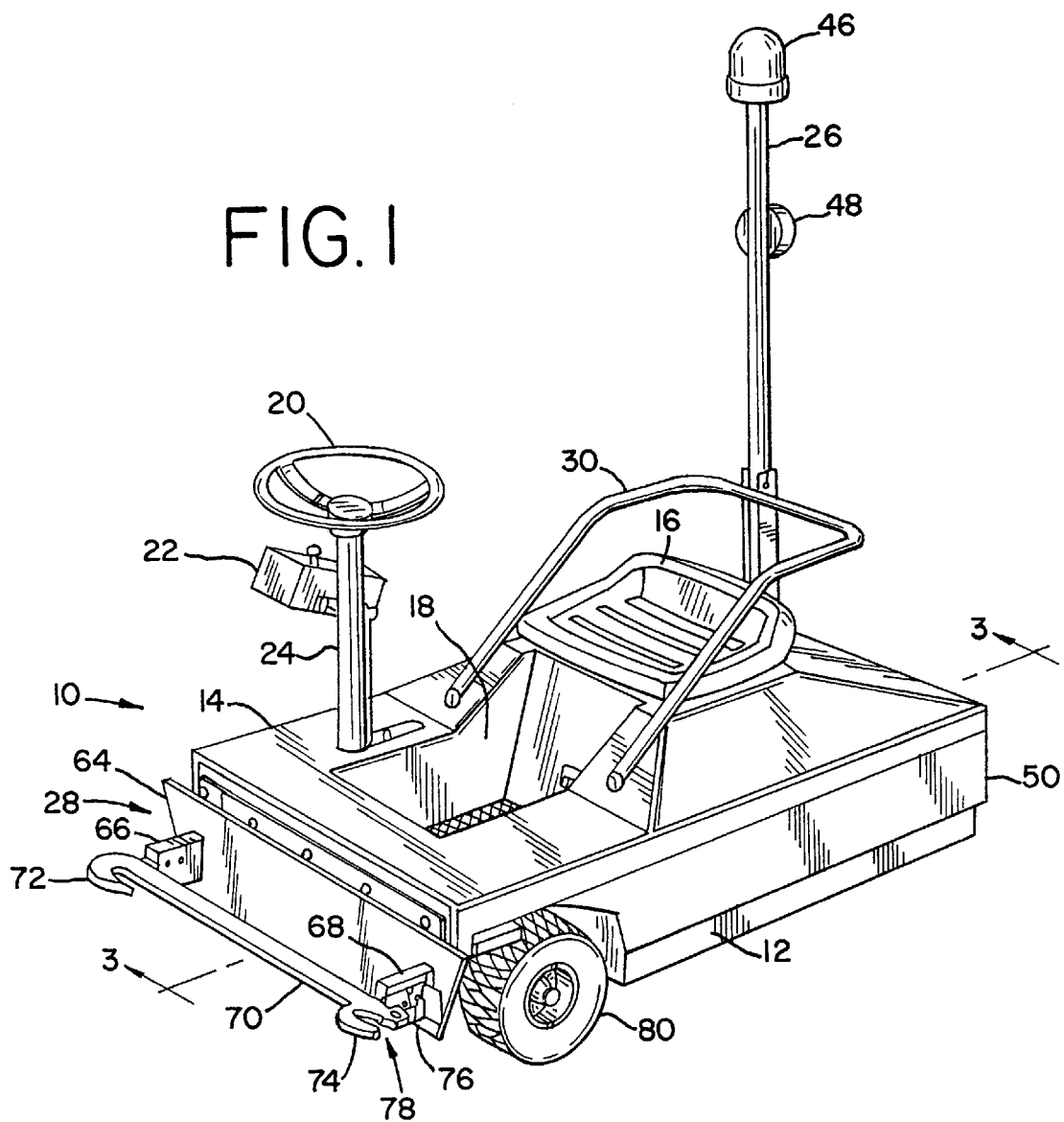
FIG. 1 is a perspective view of the vehicle of the present invention.
Figure 2:
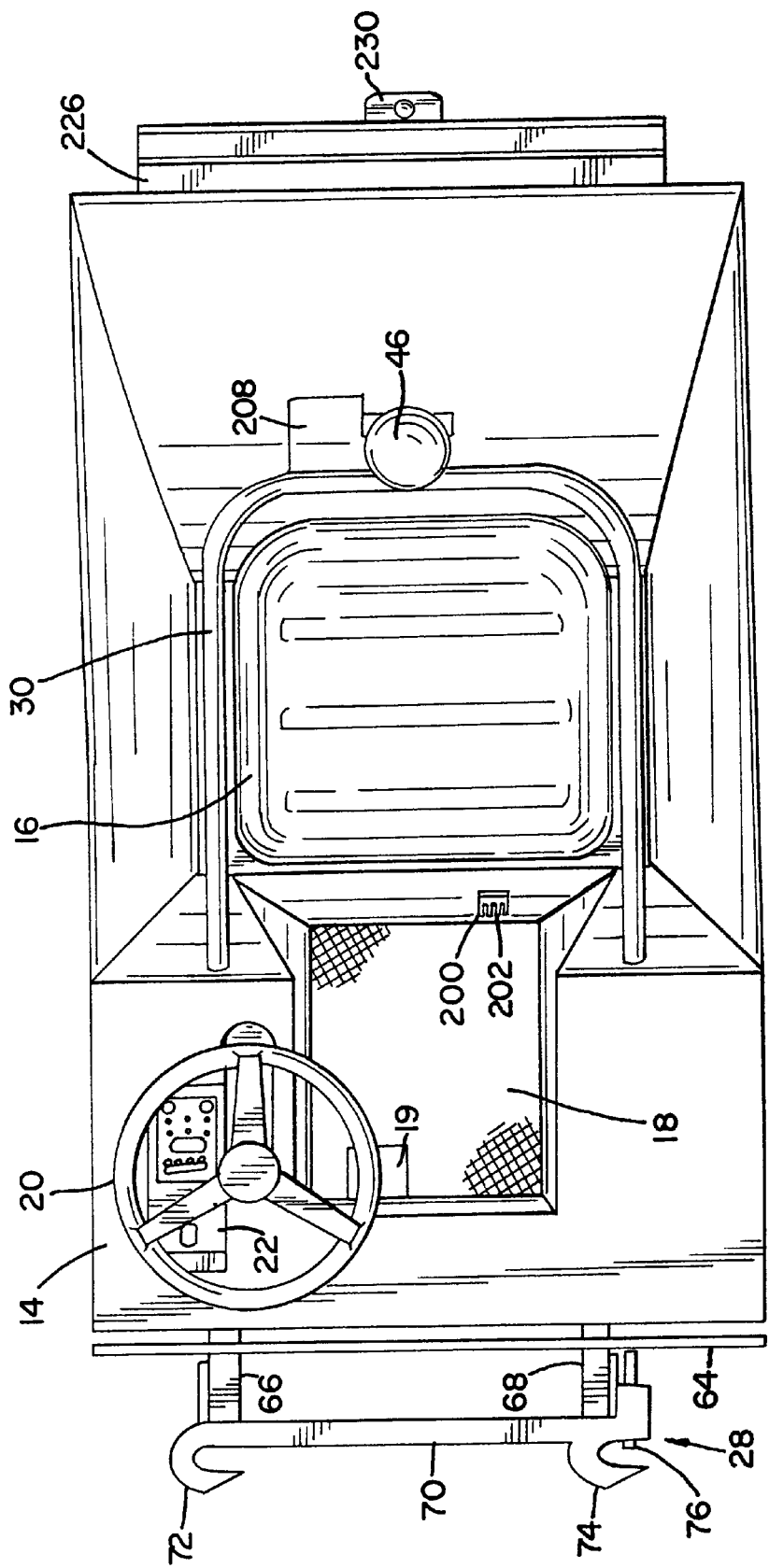
FIG. 2 is a top view of the vehicle of the present invention.
Figure 3:
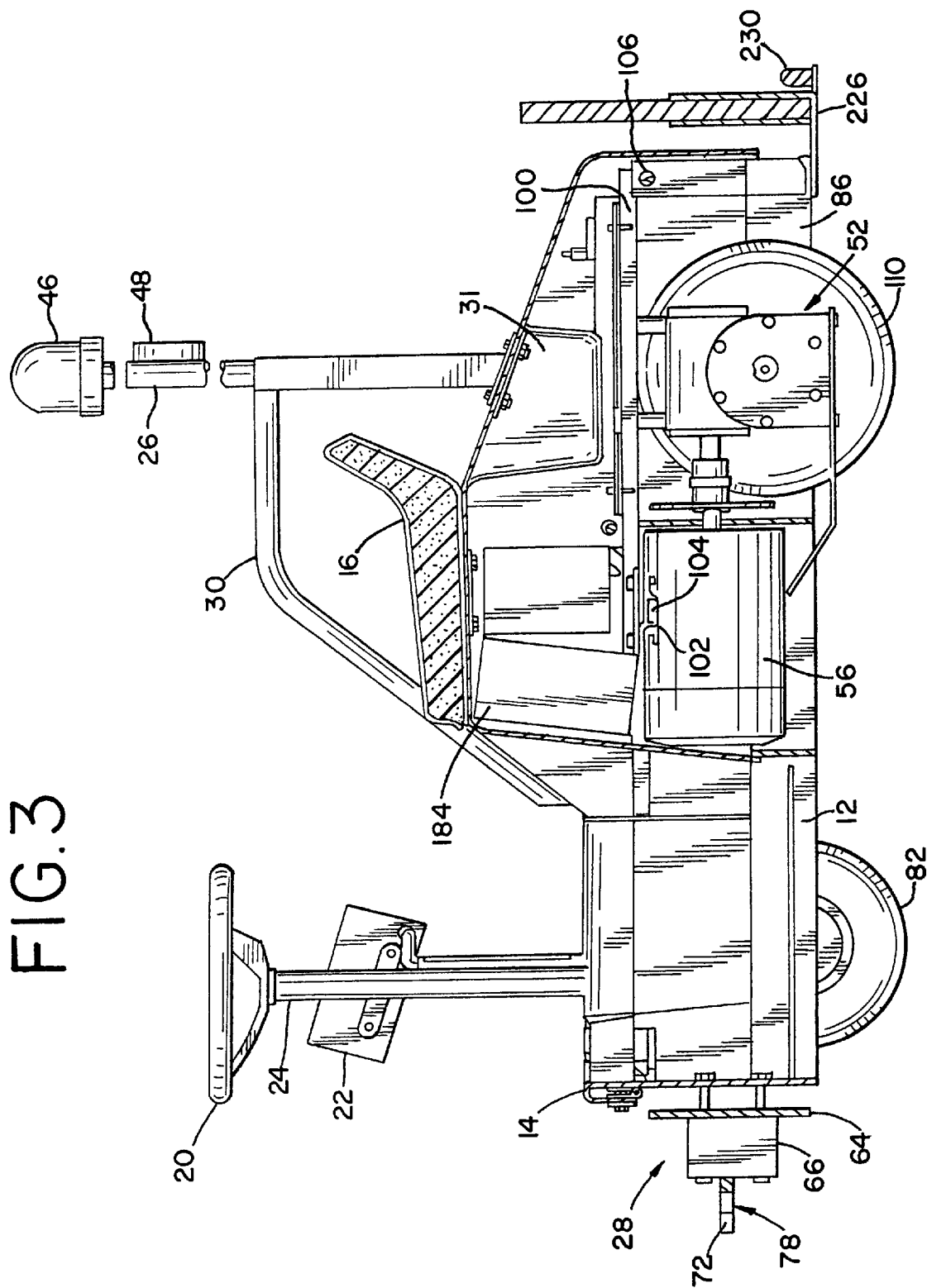
FIG. 3 is a cross-sectional view taken along line 3—3 in FIG. 1.

The present invention is an electric powered vehicle used for the retrieval of wheeled shopping carts. Turning to FIGS. 1, 2 and 3, the vehicle, designated 10, has a steel chassis 12 and an upper housing 14. The vehicle includes a seat 16 for the operator, a recessed foot area 18 which contains a foot pedal 19 and a steering wheel 20. A control box 22 is located on the steering column 24, and an antenna pole 26 for receiving the signal from a remote controller is located behind the seat 16. A shopping cart coupler 28 is located on the front of the vehicle 10.

Figure 9:
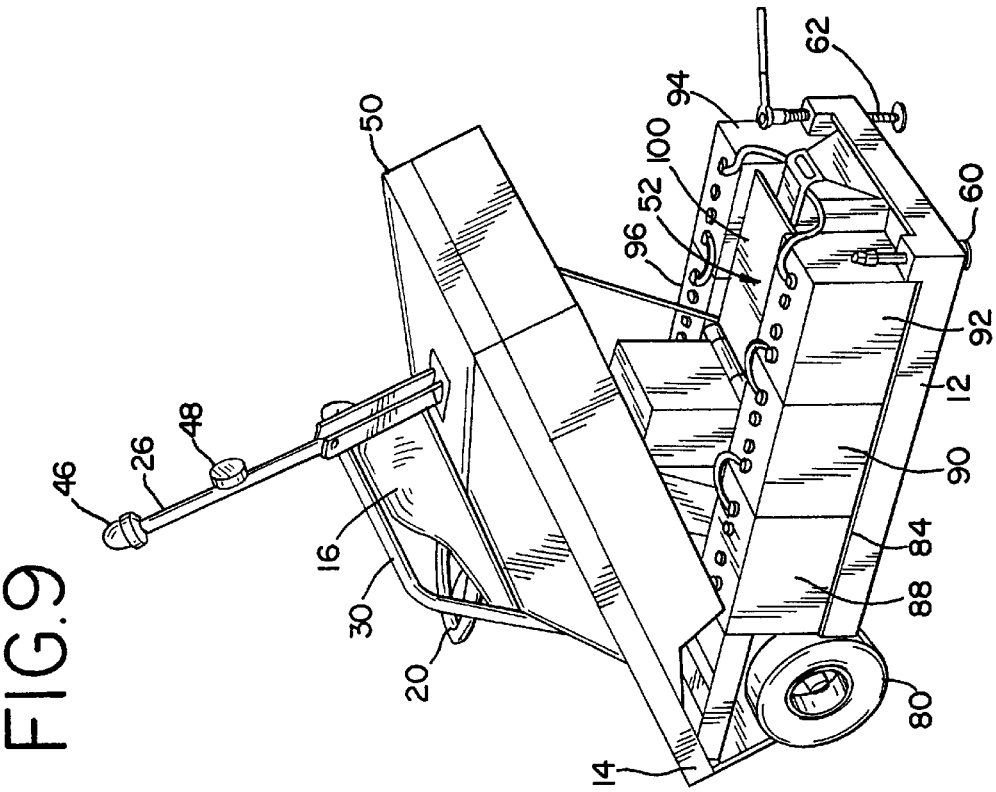
FIG. 9 is a rear perspective view of the present invention with the housing raised.

The upper housing 14 of the vehicle 10 is preferably a one-piece molded polyethylene or fiberglass housing. As seen in FIGS. 2 and 9, the upper housing 14 is hinged to the chassis 12 at the front. This allows the upper housing to be raised, as seen in FIG. 9, to provide access to the controller 184, motor 56, parking brake assembly 124, drive assembly 52 and related components for servicing as will be explained in greater detail below. The seat 16 includes arm and back rest 30. The upper housing 14 additionally includes a storage pocket 31 with a hinged, sealed cover into which a ten-foot cord for charging the vehicle (not shown) and a remote transmitter 160 are placed when not in use. The antenna pole 26 is preferably a hinged steel pole extending from the aft portion of the housing 14 that acts as a radio antenna when the vehicle 10 is operating in the remote control mode. The pole 26 can fold down for storage purposes.

The control console 22, shown in FIGS. 2 and 7, has controls for both operation of the vehicle and battery charging of the vehicle. A key switch 32, emergency stop 34 and forward and reverse direction selector 36 are located on the console and used for the operation of the device. Indicator 36a lights up when the forward direction is selected and indicator 36b lights up when the reverse direction is selected. The control console includes a push button 38 for selecting a manual control mode or a remote control mode. Indicator 38a lights up when the manual mode is selected and indicator 38b lights up when the remote control mode is selected. The control console additionally has an indicator 40 which lights up when charging the batteries, with charge level indicators 42, and an overheated condition indicator 44. The control console is preferably covered by a weatherproof membrane.

The vehicle has several safety features on its exterior. A rotating beacon 46 is mounted on the top of the antenna pole 26. A high visibility taillight 48 is mounted on the antenna pole 26 and reflective tape 50 is located on all four sides of the vehicle.

The steel chassis 12 forms the main frame of the vehicle and houses the drive assembly 52, the emergency brake assembly 54, the motor assembly 56, the steering mechanism 58, the batteries, the central controller 184 and auxiliary components. The steel chassis 12 can include screw jacks 60 and 62 located in the aft corners as seen in FIG. 9. The exterior of the steel chassis includes the shopping cart coupler 28 in the lower front.

The shopping cart coupler 28 includes a front plate 64 with two mounting blocks 66 and 68 as seen in FIGS. 1, 2, 3 and 6. A coupler jaw bar 70 is mounted to the two mounting blocks 66 and 68. These mounting blocks are preferably made from plastic to electrically isolate the vehicle 10 from the coupler jaw bar 70. The coupler jaw bar 70 includes jaws 72 and 74 on opposite ends for surrounding the legs, shown in broken line as 204 and 206, of a shopping cart. One of the jaws has a locking pin 76 which has a locking rod 76a and a foot activation plate 76b. The locking pin is foot actuated by pressing on the activation plate 76b. When actuated, the locking rod 76a extends across the open portion 78 of jaw 72.

The chassis 12 is indented at its front corners to form areas for the two front steering wheels 80 and 82. The steering column 24 is coupled to one of the front wheels, which in turn is coupled to the other front wheel with the tie rod (not shown) in a well-known manner as one skilled in the art can appreciate. Turning the steering wheel to the left causes the vehicle to turn to the left and turning the steering wheel to the right causes the vehicle to turn to the right.

The chassis 12 includes two rectangular areas 84 and 86 in the aft portion for housing two parallel banks of batteries. Rectangular area 84 holds three batteries 88, 90 and 92. Rectangular area 86 holds three batteries 94, 96 and 98. The batteries are preferably 6 V, lead acid cells. The drive assembly 52, shown in exploded view in FIG. 4, is located between the two rectangular areas. The drive assembly 52 includes a mount plate 100 which is hinged to the chassis 12 at 102 by rod assembly 104 which is secured to the plate with fasteners 104*a* and 104*b*. A lock pin assembly 106 is located at the rear of the drive assembly 52 for locking the drive assembly 52 to the chassis 12. The drive assembly 52 includes a motor 108 which is preferably a 2 HP DC 36 V motor with 50 amps. The motor is mounted to plate 100 with a bracket 108*a* and fasteners, one of which is designated 108*b*. The drive motor 108 utilizes dynamic braking.

Drive shaft 116 extends from motor 108 and is keyed to a tachometer disc 118 on a first side. The tachometer is coupled on its second side to drive shaft couplings 116*a*, 116*b* and 116*c*. These are in turn coupled to the gear reducer shaft 114*a*. The gear reducer 114 contains a worm gear drive (not shown) and reduces the rotation of the drive shaft 20 to 1. The rear wheels, one of which is shown as 110 in FIG. 3, mount on spindles 114*b* and 114*c* extending from the worm gear drive in the gear reducer 114.

Figure 5A:
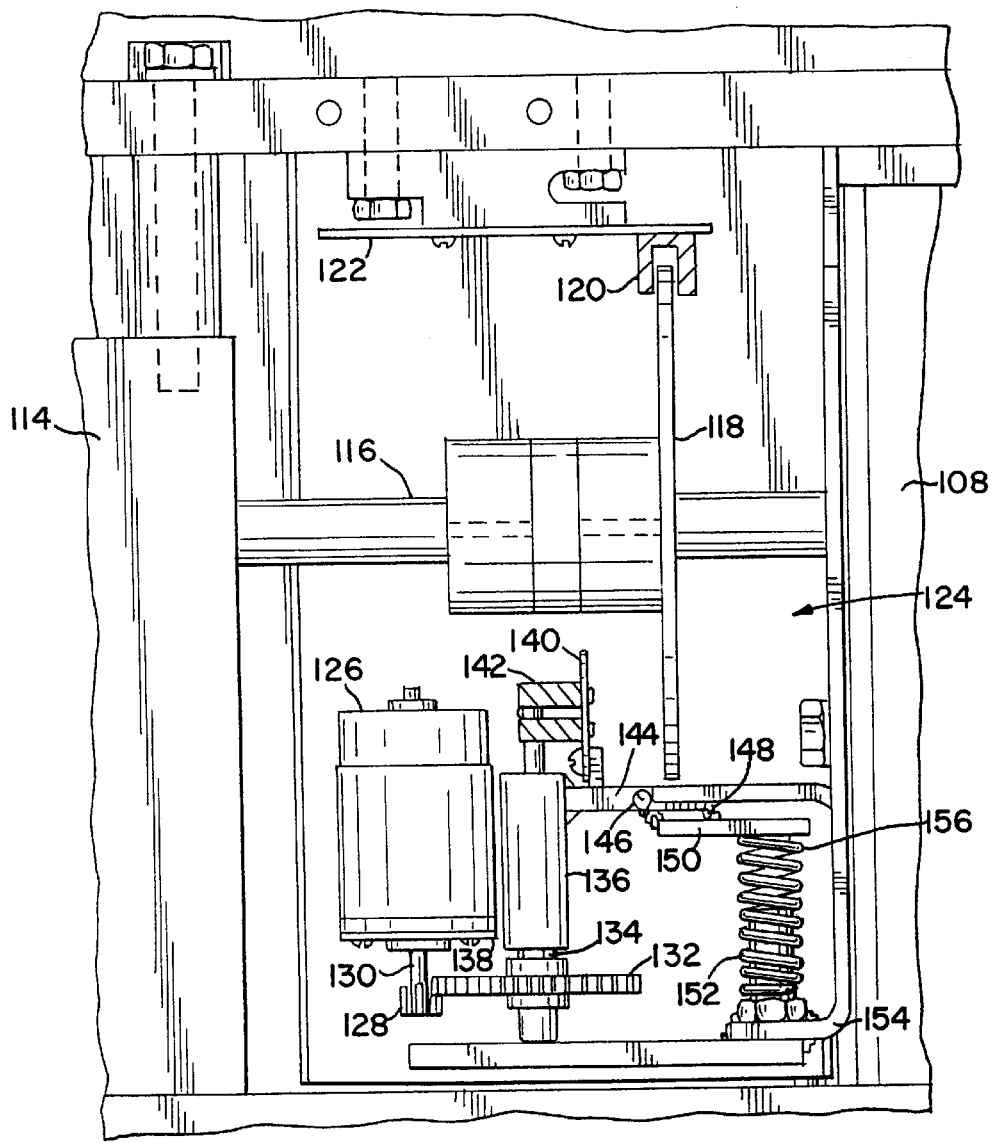
FIG. 5A is a side view of the drive and one embodiment of the parking brake assembly of the present invention.

Turning now to FIG. 5A, one end of tachometer disc 118 extends into an LED 120. LED 120 is coupled to the brake tachometer controller 122. The disc 118 has a plurality of slits equally spaced along its peripheral edge. As the disc 118 rotates, the LED switch 120 counts the plurality of slits and sends a signal representing the rotational rate of the motor shaft to the brake tachometer controller 122.

In an alternative embodiment, two LED's are positioned in close proximity to each other. Circuitry in the controller 184 (discussed below with reference to FIG. 11) detects the direction of travel by sensing the order in which the LED's are triggered as the tachometer 118 rotates.

The drive assembly 52 additionally includes an emergency or parking brake assembly 124, shown in FIG. 5A, which acts as a safety or emergency brake for the vehicle 10 when it is at rest on a hill. The emergency brake includes a 12 V DC PM motor 126. A pinion gear 128 is located on the drive shaft 130 of the motor 126 and engages a spur gear 132 which is mounted on a lead screw 134. The lead screw 134 is threaded into a rocker arm 136. The rocker arm 136 is bolted to the motor 126 at area 138. At the opposing end, a parking brake position PC board 140 and LED switch 142 is fastened to the lead screw 134 and a pivot arm 144 extends from the rocker arm 136. This pivot arm 144 is secured to a pivot pin 146. The portion 148 of the pivot arm 144 that extends on the side of the pivot pin opposite from the rocker arm 136 is welded to a spring plate 150.

A compression spring 152 is mounted to the brake mounting bracket 154. The free end 156 of the compression spring 152 rests against the spring plate 150. The spring 152 acts to push the pivot arm portion 148 against the tachometer disc 118. The friction between the pivot arm 144 and the tachometer disc 118 prevents rotation of the disc 118, drive shaft 116, gear reducer shaft 114*a* and the rear wheels. When the brake is released, the motor 126 acts to rotate the lead screw 134 causing the pivot arm portion 148 to pivot away from contacting the tachometer disc 118. The motor 126 thus works against the action of the spring 152. When the brake controller 122 receives a signal to engage the brake, the motor 126 reverses, the spring 152 pushes against the pivot arm 144, causes portion 148 to contact the tachometer disc. When the brake is to be released, the motor 126 is powered and rotates the lead screw 134 to cause the pivot arm 144 to move away from the tachometer disc 118. The LED 142 detects the position of the pivot arm 144 with respect to the tachometer disc 118. The brake position PC Board 140 then sends the appropriate signal to the brake controller 122.

Figure 5B:
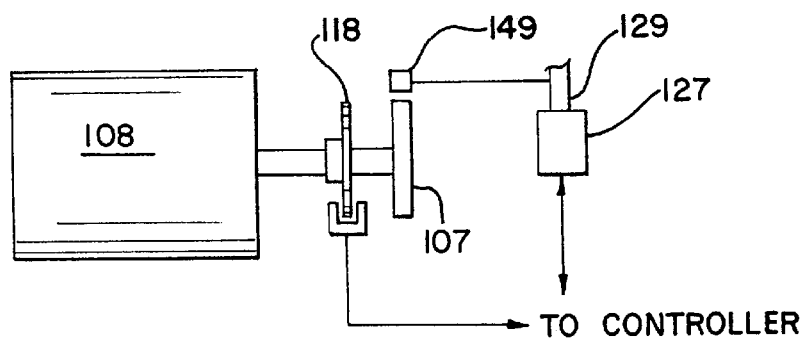
FIG. 5B is a block diagram of an alternative embodiment of the parking brake assembly of the present invention.

In an alternative embodiment shown in FIG. 5B, a parking brake solenoid is used instead of a parking brake motor 126. When the controller 184 senses that the speed has dropped below a threshold, the parking brake solenoid 127 is de-energized. The solenoid 127 preferably includes a solenoid core 129 that is spring-mounted such that, when de-energized, the solenoid core 129 defaults to a position that enables a brake mechanism 149 to engage the brake disc 151. When a drive signal is sensed (as discussed further with reference to FIG. 11), the solenoid 127 is energized, thereby causing the brake mechanism 149 to release the disc 151. The advantage of the parking brake assembly of FIG. 5B is that the parking brake function is accomplished efficiently. Because the solenoid is de-energized when the parking brake is engaged, no power is necessary to maintain the parking brake engaged. In addition, the solenoid 127 may be energized (to disengage the parking brake) using pulse width modulation with a signal having a very low duty cycle to conserve battery power.

The vehicle additionally has a feature which prevents the motor from rotating at a predetermined unsafe speed for the vehicle. As the tachometer disc 118 rotates with the motor shaft 116, the LED switch 120 counts the slits in the disc 118 and the rotational speed of the disc is determined. A feedback loop is utilized to regulate the motor output rpm. This motor output speed can be adjusted to maintain the vehicle at low speeds and should not exceed 5–7 mph.

Figure 8A:
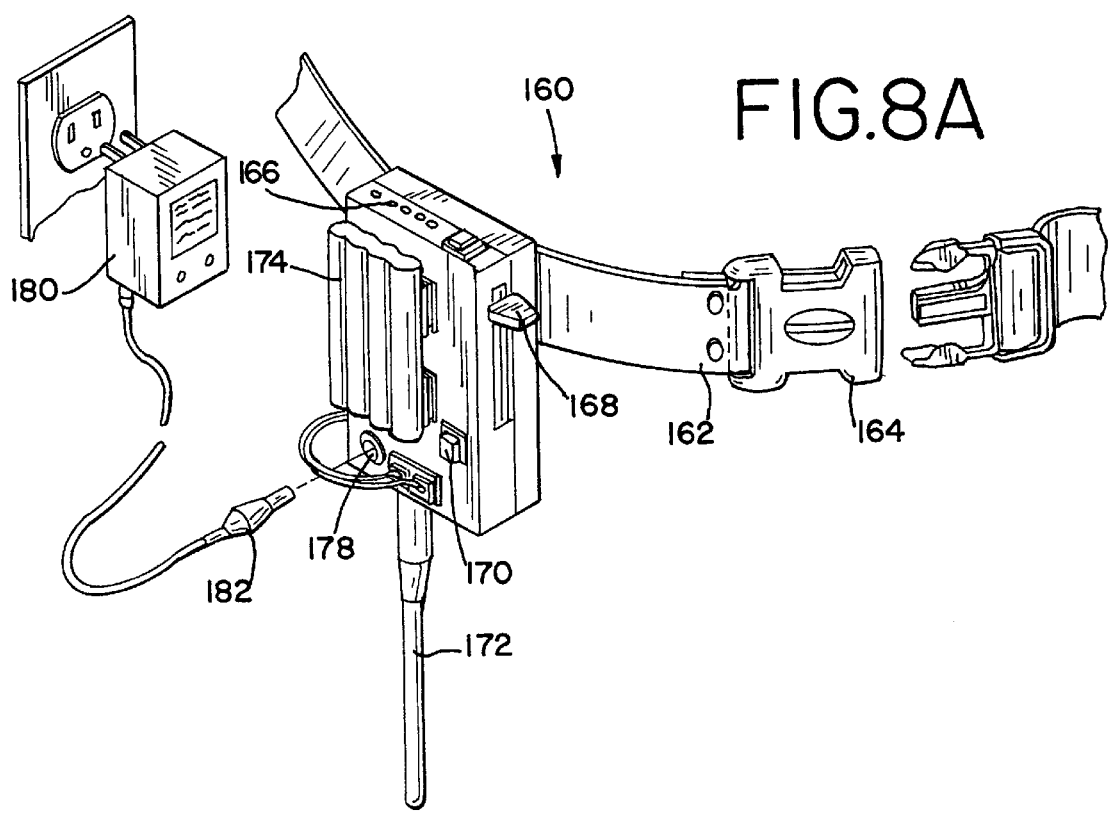
FIG. 8A is a perspective view of the remote control transmitter of the present invention.
Figure 8B:
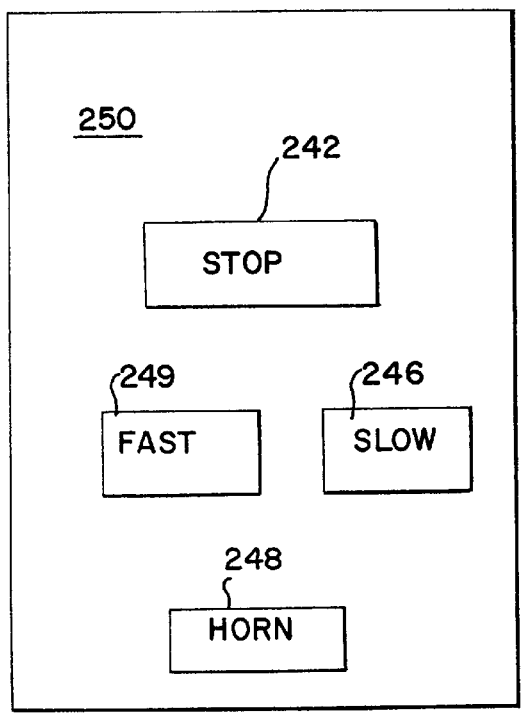
FIG. 8B is a front view of one embodiment of a hand-held remote control transmitter of the present invention.

FIGS. 8A and 8B depict alternative embodiments for a remote control transmitter. In FIG. 8A, the remote control transmitter 160 is hooked to a nylon belt 162 with a quick release buckle 164. The remote control transmitter 166 includes a charge level indicator 166 consisting of five LED's. An accelerator thumb operated lever 168 controls the forward speed and braking of the vehicle. A transmit enable push-button 170 must be held down continuously to operate the machine. A whip antenna 172 extends from the lower portion of the transmitter 160. A battery pack 174 consisting of eight 1.2 volt encased NiCad cells is secured to the transmitter 160 with pads 176 made out of hook and loop material, such as Velcro®. The transmitter 160 includes a charging socket 178 for the batteries. A transformer-rectifier 180 and corresponding charger jack 182 is used for charging the transmitter 160.

The hand-held, remote control transmitter 250 illustrated in FIG. 8B, offers a lightweight, pocket-sized alternative to the belt-mounted transmitter 160 of FIG. 89A. The handheld remote control transmitter 250 of FIG. 8B includes a stop button 242, a fast button 244, a slow button 246 and a horn button 248. The hand-held remote control transmitter 250 transmits a radio signal that carries information that corresponds to the function of the button pressed.

In a preferred embodiment, either the belt-mounted remote control transmitter 160 or the hand-held remote control transmitter 250 may communicate with the signal receiver 186 by transmitting a radiant energy signal. The radiant energy signal preferably comprises a radio signal having a carrier signal that has been encoded with information using pulse code modulation (PCM). The carrier signal preferably transmits at 400 Mhz, although any suitable frequency may be used. The information may be coded into the signal in a series of digital words having a predetermined format. The signal receiver 186 extracts the information from the signal according to the predetermined format. FIG. 8C illustrates one example of PCM-based communication between the hand-held remote control transmitter 250 and the signal receiver 186.

As shown in FIG. 8C, the remote control transmitter 250 transmits a digital signal (designated T) for reception by the signal receiver 186 via the antenna pole 26 on the vehicle. In a preferred embodiment, signal T has a format in which a security code 251 and a command 253 are transmitted in the form of a pair of eight bit words in which the command 253 word follows the security code 251. The eight bit pattern of the security code 251 matches an identifier code that the signal receiver 186 expects in order to extract the command 253 following the code 251. The signal receiver 186 comprises pulse code modulation receiver circuitry that filters radio signals at a selected frequency and stores the bit patterns received for comparison with the identifier code. The selected frequency is selected to match the radio frequency of the transmitter, which is preferably at about 400 Mhz. The identifier code may be stored on the signal receiver 186 on a dipswitch, in read only memory (ROM, EPROM, etc.) or by hardwired jumpers.

When the signal receiver 186 receives a matching security code 251, the command 253 is extracted from the signal T. The signal receiver 186 determines a message from the command according to a predetermined set of eight bit values as shown in FIG. 8D. A plurality of signal outputs 324 are controlled by the signal receiver 186 in response to the command 253. The signal receiver 186 outputs a voltage level at a signal output designated for each command. For example, if the signal receiver 186 senses an eight-bit value that matches the command word for the fast command, the state of the fast signal output 252 is switched to a level that denotes the enable fast command. The slow signal output 254, stop signal output 256 and horn 268 operate in a similar fashion.

FIG. 8D illustrates the values used for a set of four commands that correspond to the four buttons on the remote control transmitter 250. It is to be understood by one of ordinary skill in the art that the set of commands are those used in a preferred embodiment and that commands may be added or removed according to specific configurations. Buttons may be added to the remote control transmitter 250 and additional commands may be implemented by using additional command values.

It is readily apparent to one of ordinary skill in the art that the foregoing description of preferred embodiments of a communication system is by way of example. Alternative embodiments are possible without violating the scope of the invention. For example, alternatives to the eight-bit word format chosen for remote commands as shown in FIG. 8D may include different codes, such as binary coded. decimal (BCD), hexadecimal, octal or ASCII. In addition, the specific values chosen for commands in FIG. 8D are purely illustrative. The number of bits used in the word may also be varied. The advantage of having a large number of bits in a word lies in the greater number of security codes available to the user.

The advantage of using PCM for communicating via remote control is that relatively good noise immunity can be achieved at a low cost. Alternatives to PCM as a communication system are possible. Pulse amplitude modulation, phase shift keying, frequency shift keying, spread spectrum, frequency modulation or amplitude modulation are also possible. Alternatives to radio communication are also possible. Such alternatives include infrared communication, ultrasound communication and other wireless forms of communication.

The communication system discussed with reference to the remote control transmitter 250 of FIG. 8B uses a one-way communication scheme. The advantage of the system described above is its simplicity and low cost. The communication is one-way because only four commands (fast, slow, stop and horn) are communicated. The transmitter 250 invokes a closed loop system for bringing the vehicle to the appropriate speed regardless of load The use of a button for fast operation and a button for slow operation in conjunction with an acceleration limiting circuit (acceleration limiter 316) provides a system that is sufficiently flexible for the task of pushing carts, yet is adaptable to variations in load.

It is readily apparent to one of ordinary skill in the art that a two way communication system may be implemented as well. A slide button such as the one illustrated in FIG. 8A may be implemented using feedback from the vehicle to bring the vehicle to a desired speed with different loads.

Figure 10:
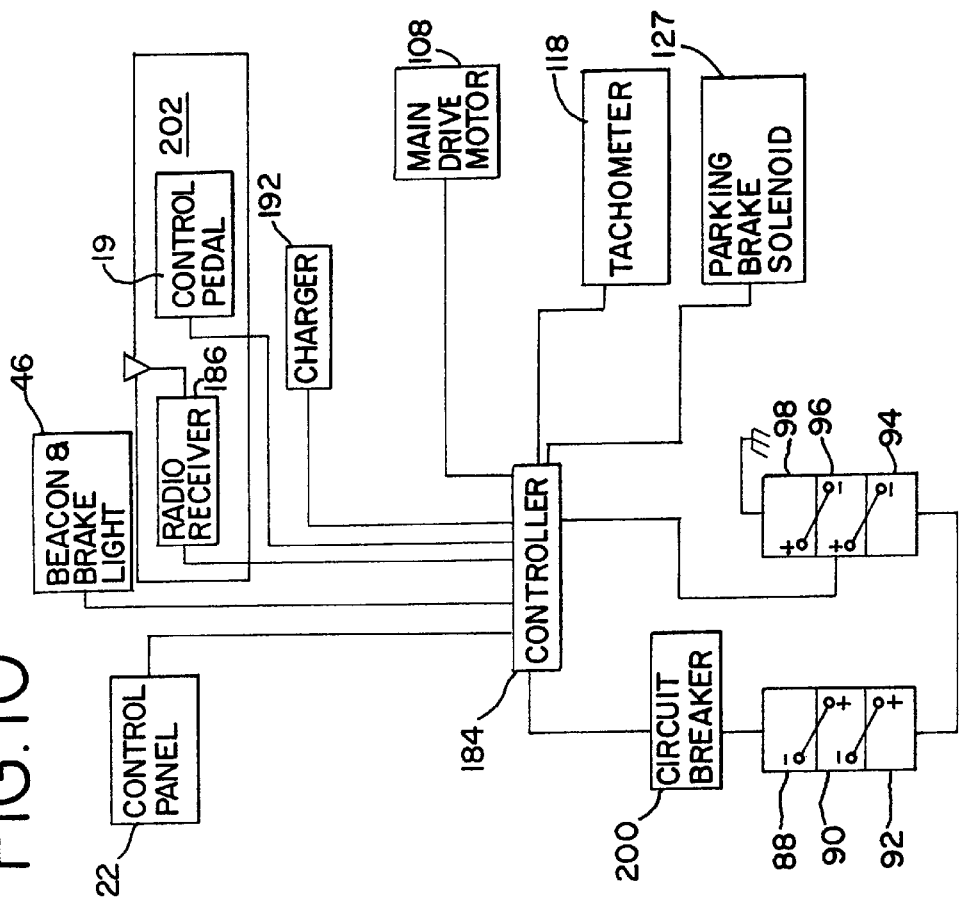
FIG. 10 is a block diagram of one embodiment of the controls of the present invention.

Turning to FIG. 10, the vehicle 10 includes a central controller 184 that processes signals from a variety of inputs and executes the control functions to operate the vehicle. Among the signals coupled to the controller 184 are drive signals that communicate parameters needed by the controller 184 for moving the vehicle. These drive signals may be generated by any means for generating drive signals 202. FIG. 10 depicts two examples of means for generating drive signals 202. The control pedal 19 generates a signal that varies the speed or invokes the dynamic braking according to the extent of travel of the pedal. The signal receiver 186 generates digital signals whose states denote the presence of a command. Other means for generating drive signals 202 that may be used include a lever, a knob, a push button or any other suitable device.

As shown in FIG. 10, the control panel 22 and the control pedal 19 are coupled to the controller 184. Likewise, the signal receiver 186 is coupled to the antenna 26; and, the beacon 46 and brake light 48 located on the antenna pole 26 are coupled to the controller 184. The controller 184 will process the signal sent from the control console 22 or from the remote transmitter 160 via the signal receiver 186. The controller 184 then sends the appropriate signal to the main drive motor 108, or the parking brake solenoid 127. The six batteries 88, 90, 92, 94, 96 and 98 are connected to the controller 184 with the main circuit breaker 200 interposed.

The controller 184 will be discussed with reference to the block diagram of the controller 184 in FIG. 11. As shown in FIG. 11, the controller 184 receives a plurality of control signals and performs the appropriate function. The primary functions of the controller 184 are to drive the motor that moves the vehicle forward or in reverse, to operate the dynamic braking and parking brake functions and to respond to changes in direction. The controller 184 may include other functions such as fault detection and power control functions.

The controller 184 includes motor switching circuitry for receiving the plurality of control signals, or drive signals that communicate commands to move the vehicle. The motor switching circuitry generates signals necessary to command a motor interface to drive the motors in response to the drive signals. In a preferred embodiment described below, the motor interface includes a pulse width modulation system which receives the drive signals from the motor switching circuitry and generates signals to power transistors in forward and reverse drives. The signals that are received by the motor interface are regulated, however, according to speed limiting and acceleration limiting circuits that provide desirable safety and load compensation advantages. Although a preferred embodiment will be described below with reference to FIGS. 11 and 12A–F, it is to be understood by one of ordinary skill in the art, that a variety of embodiments may be developed that limit speed and acceleration in a cart retrieval vehicle to thereby provide safety and load compensation advantages.

The controller 184 in a preferred embodiment includes a motor drive switching circuit 300, a direction switching circuit 302, a brake switching circuit 304, a speed selection switching and adjustment circuit 306, a direction sensor failure detector 308, an RPM pulse generator 310, a speed limit filter and error amplifier circuit 312, an acceleration limiter 316, a level shift amplifier circuit 317, a pulse width modulator 318, a forward drive switching circuit 322 and a reverse drive switching circuit 320.

In addition, the controller 184 includes an input for the tachometer signal 286 which provides direction and speed information. The direction sensor failure detector 308 outputs a fault signal if one or both of the LED signals is not sensed for approximately one second at anytime that drive current is applied to the motor 108.

During normal operation, the controller 184 receives either signal receiver signals 324, control pedal signals 328 or control panel signals 326 depending on the operational mode of the vehicle. The user selects remote mode or manual mode at the control panel 22. If the vehicle is in remote mode, signal receiver signals 324 are received from the signal receiver 186. As discussed with reference to FIGS. 8C and 8D, the signal receiver signals 324 include a fast, slow, horn and stop signal.

The controller 184 receives control panel signals 326 from the control panel 22 which include signals for direction (FWD/REV), stop and remote/manual mode operation.

The control pedal signals 328 reflect the extant of control pedal 19 travel, or the extent to which the control pedal 19 is pressed. If the control pedal 19 has been pressed to within a selected fraction of travel, the controller 184 invokes the dynamic braking function. When the pedal 19 is pressed beyond the selected fraction of travel, the controller 184 drives the motor 108 to a speed that is dependent upon the extent of travel of the pedal 19 beyond the selected fraction. As the pedal 19 is pressed further, the speed of the vehicle is increased. In a preferred embodiment, the selected fraction of travel during which dynamic braking is invoked is about $\frac{1}{3}$. Any other fraction may be used.

Figure 12A:
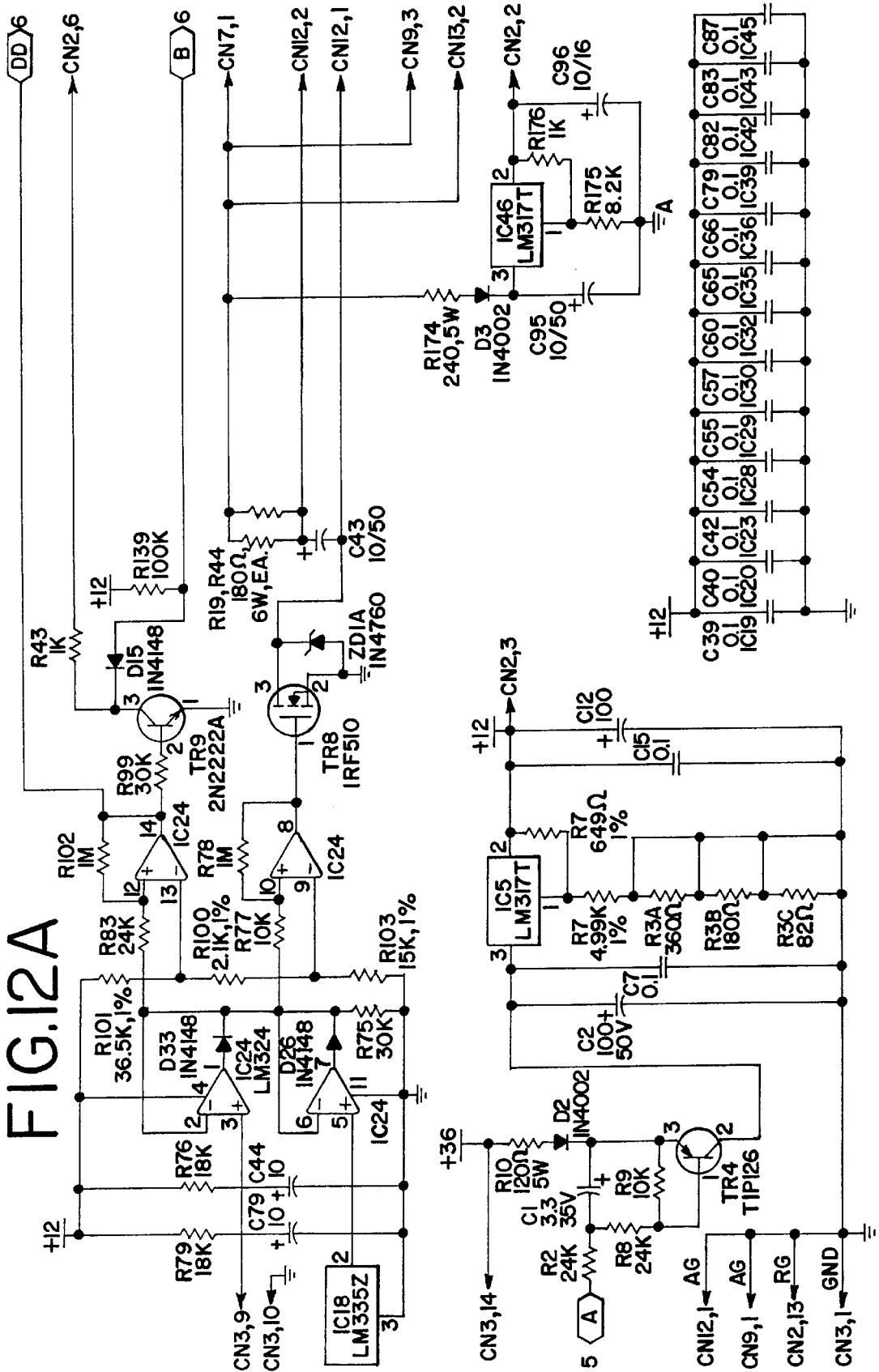
Figure 12B:
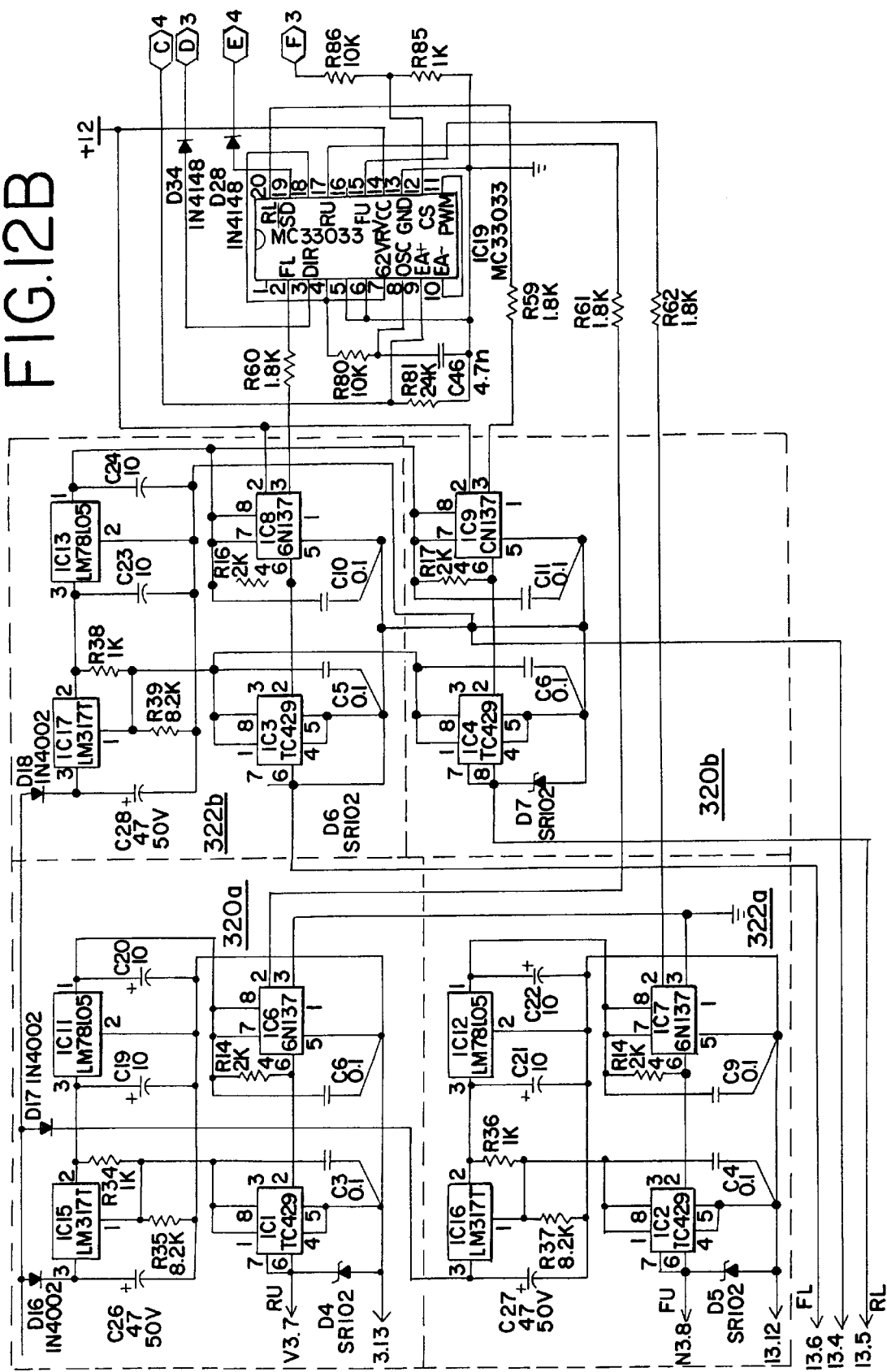
Figure 12D:
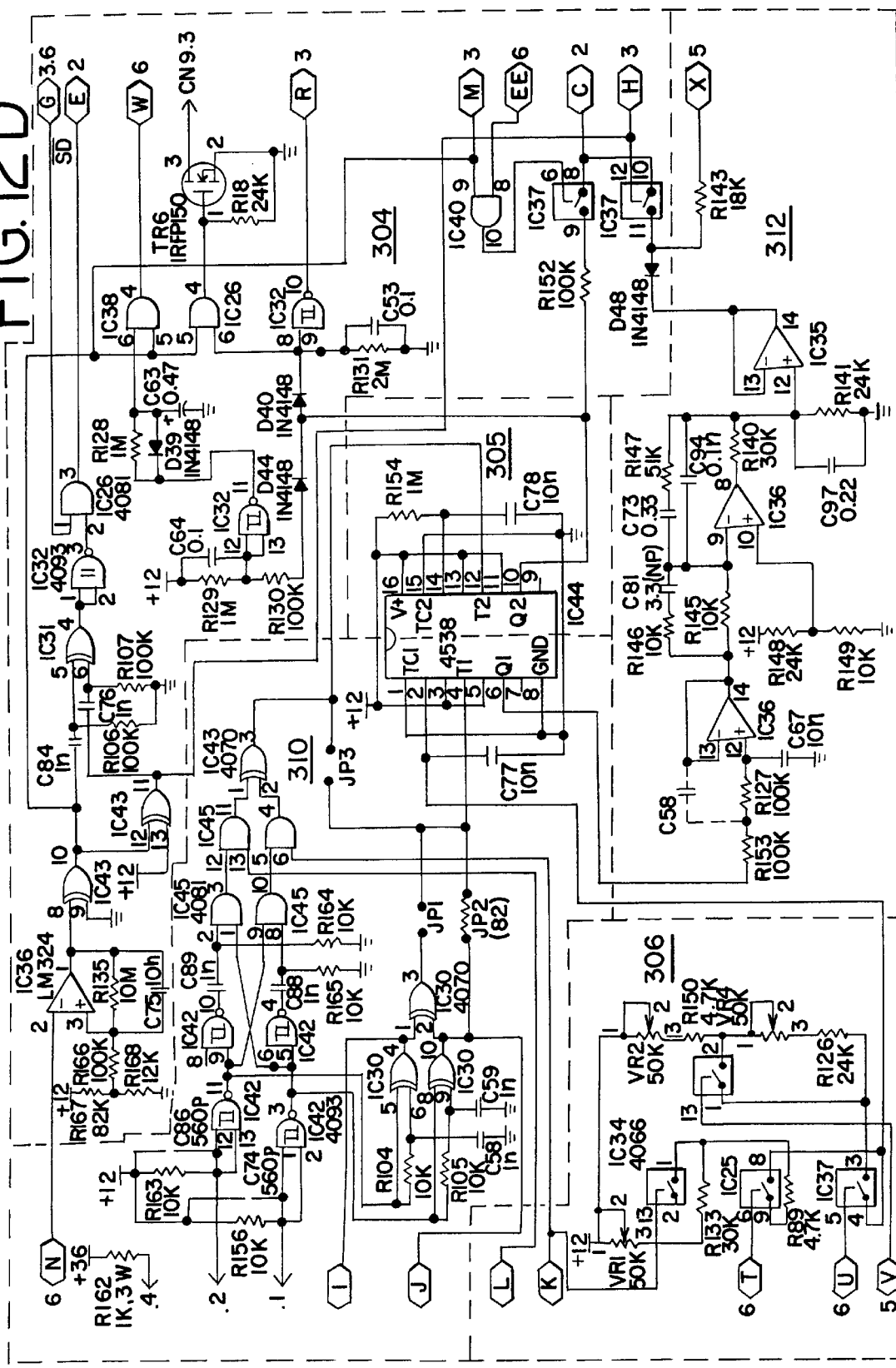
Figure 12E:
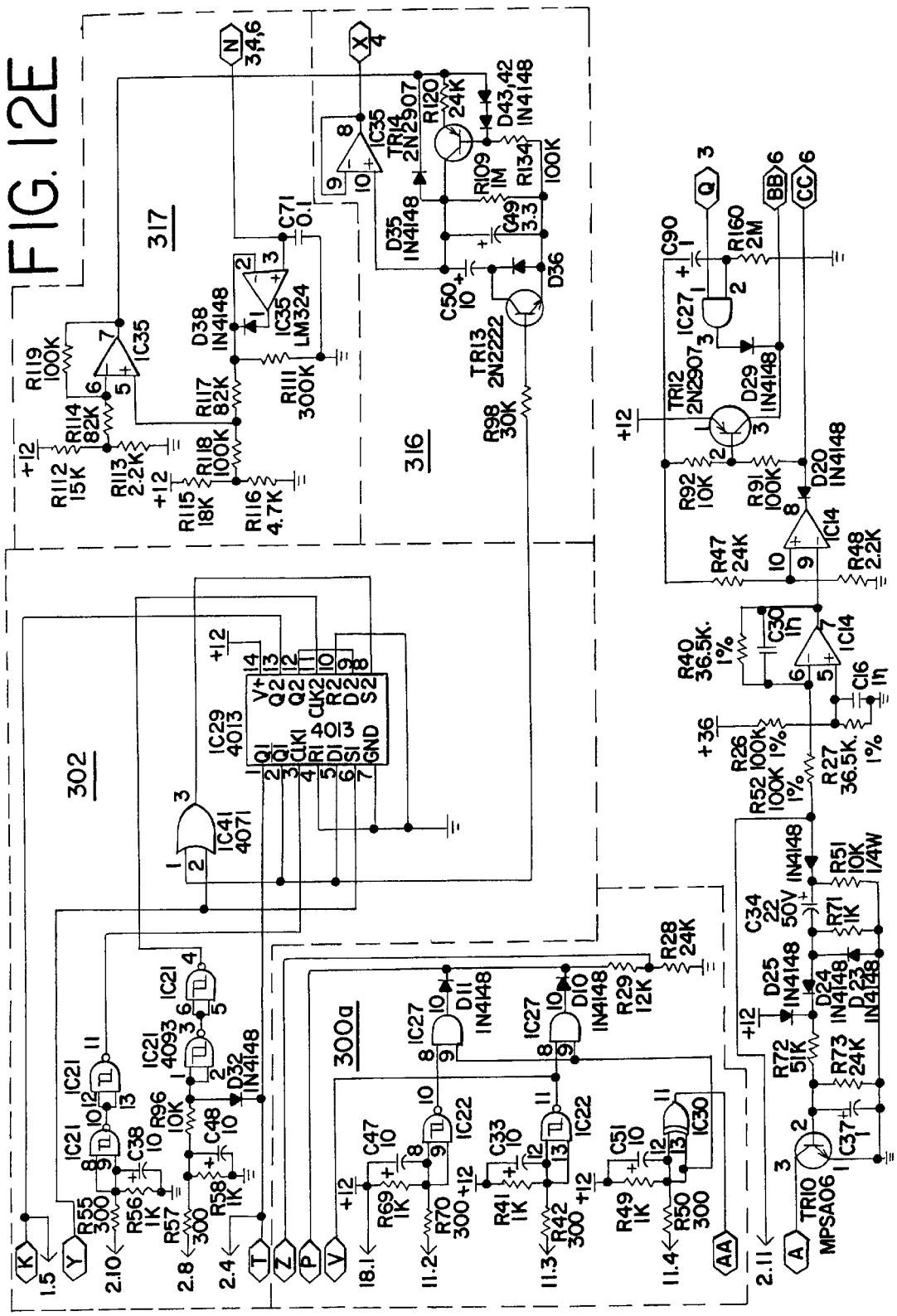
Figure 12F:
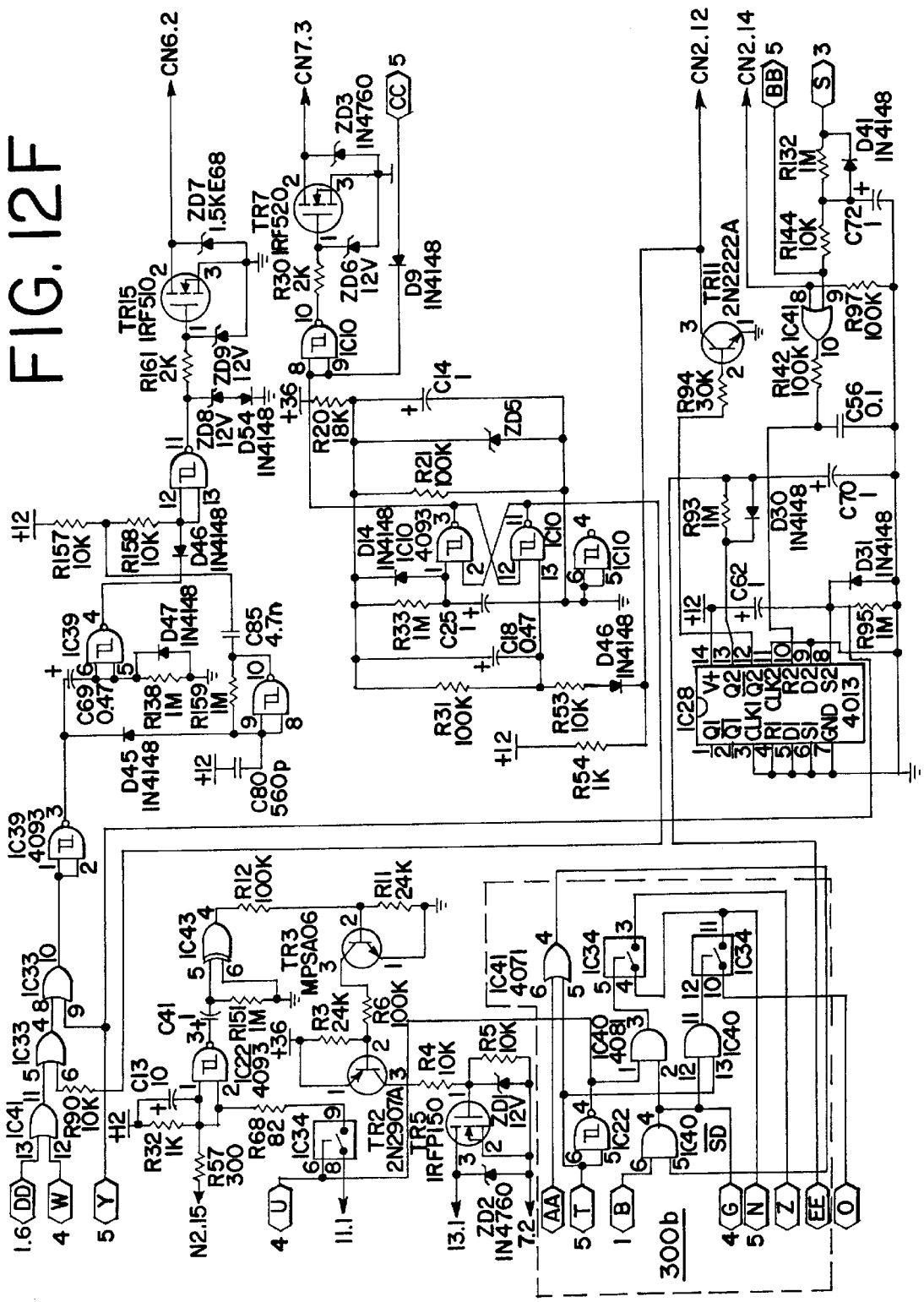

In a preferred embodiment, the state of the signals received at the controller 184 in remote mode is indicated by voltage level. For example, the remote fast and slow signals are communicated as digital signals to the motor drive switching circuit 300. An example of a motor drive switching circuit 300 in a preferred embodiment is illustrated in FIGS. 12E and 12F. A specific voltage level (i.e. 12 v.) at the signal indicates that the fast or slow speed is selected and a second voltage level (i.e. 0 v.) indicates that the fast or slow speed is not selected. Constant maximum speeds are designated for the fast and slow speeds in remote mode as opposed to the variable speed available through the pedal 19 in manual mode.

One important advantage of the controller 184 in a preferred embodiment is that variations in load during remote operation are compensated by adjustments in speed. Remote operation provides a slow speed and a fast speed setting. At either speed setting, changes in load are sensed by a drop in the speed in the vehicle. The controller 184 senses the speed via the tachometer 118. When a variation in speed is sensed, the fixed slow or fast speed setting operates to provide more power to the motor. In manual mode, the speed adjustment is not available because the speed in manual mode is variable. The user senses the drop in speed and makes adjustments to the control pedal accordingly. It is to be appreciated by one of ordinary skill in the art that in an alternative embodiment, a manual mode may entail speed adjustment using fixed speed setting elements such as push buttons, rather than variable speed setting elements such as a pedal. Such an embodiment in manual mode may incorporate the load compensation functions described below with reference to the remote mode.

In order to regulate the speed to obtain load compensation in remote mode, the motor drive switching circuit 300 and the brake switching circuit 304 are coupled to the speed limit filter and error amplifier 312. An example of a speed limit filter and error amplifier 312 in a preferred embodiment is illustrated in FIG. 12D.

The speed limit filter and error amplifier 312 receives a speed signal from the RPM pulse generator 310. The RPM pulse generator 310 in a preferred embodiment, an example of which is illustrated at 310 in FIG. 12D, is implemented as a monostable multivibrator that generates a target speed signal 341 having a duty cycle that is indicative of the target speed setting (i.e. fast or slow speed settings). The target speed signal 341 is the signal used as an input to the speed limit filter and error amplifier 312.

The RPM pulse generator 310 generates the target speed signal 341 as a function of the present speed indicated by the tachometer signals 286 and the target speed which is indicated by the output of the speed selection and switching adjustment circuit 306. The speed selection and switching adjustment circuit 306 provides the resistive element in an RC network used to provide the time constant to the monostable multivibrator that sets the duty cycle of the target speed signal 341. The resistive value is determined in the speed selection and switching adjustment circuit 306 by the slow speed setting or by the fast speed setting.

The speed limit filter and error amplifier 312 is coupled to the acceleration limiter 316. The acceleration limiter 316 regulates the increase in speed of the vehicle when the vehicle begins to move. An example of a preferred embodiment of the acceleration limiter 316 is illustrated in FIG. 12E. During initial movement of the vehicle, the acceleration limiter provides the control voltage to the pulse width modulator 318 that drives the motors. When the acceleration limiter 318 times out, the speed limit filter and error amplifier 312 provides the control voltage in remote mode while the level sense amplifier 317 provides the control voltage in manual mode (an example of a level sense amplifier is illustrated in FIG. 12E).

The control voltage generated by the speed limit filter and error amplifier 312, the level sense amplifier 317 and the acceleration limiter 316 are coupled to a pulse width modulator 318. An example of a pulse width generator 318 in a preferred embodiment is illustrated in FIG. 12B. The pulse width modulator 318 generates a pulse train to the forward drive switch 322 and the reverse drive switch 320. The pulses in the pulse train have a pulse width indicative of the duty cycle necessary for the motor to attain the speed that is indicated by the drive signal 340. The pulse width modulator 318 in a preferred embodiment includes an MC33033 integrated circuit from Motorola.

The pulse width modulator 318 includes a current sense input from a current sense amplifier and limit selector 319. The current sense amplifier and limit selector 319 generates the current sense signal if too much motor current is sensed.

The controller 184 includes a brake switching circuit 304 to stop the vehicle by dynamic braking and to activate the parking brake through the brake pulse generator 305. For dynamic braking, the brake switching circuit 304 senses a stop signal and in response, sends a signal to change the direction of the vehicle, and a signal to command the motor to rotate in the opposite direction at a lower power.

The brake switching circuit 304 controls the parking brake by generating a solenoid modulation signal to release the parking brake and inhibiting the solenoid modulation signal to enable the parking brake. Cutting off power to the solenoid 127 releases the solenoid core 129. As discussed above with reference to FIG. 5B, the release of the solenoid core 129 causes the spring-mounted solenoid core 129 to enable the parking brake. When the drive signals are enabled, the solenoid modulation signal engages the solenoid 127 causing the solenoid core 129 to release the parking brake and enable motion. An example of a brake switching circuit 304 in a preferred embodiment is illustrated in FIG. 12D.

In a preferred embodiment, the control panel 22 switch for setting the operating mode to remote or manual is disabled if motor current is sensed by the function and mode select disable circuit 309. The controller 184 also includes circuitry that allows a stop command received by remote control to supersede a fast or slow command received by remote control.

FIGS. 12A–F is a schematic representation of a preferred embodiment of the block diagram in FIG. 11. It is to be readily apparent to one of ordinary skill in the art that FIGS. 12A–F represent one example of carrying out the present invention. A wide variety of implementations are available. For example, the circuits described above comprise a substantially analog system. Digital signals and circuits are used along with analog signals and circuits. Purely digital circuits or purely analog circuits are, however, possible without departing from the scope of the invention.

In addition, motor control may be achieved with alternative motor control schemes other than pulse width modulation. For example, motor control may be achieved using a servo control system having the speed limiting and acceleration limiting features built-in to the feedback loop. Another alternative to pulse width modulation may be voltage controlled oscillators and frequency detecting circuit combinations. In addition, alternative embodiments may be used where different types of signals are used to represent the desired functions. The RPM pulse generator 310 may include an alternative to a monostable multivibrator, such as voltage controlled oscillators, one-shot circuits or other signal generating circuits.

OPERATION OF THE VEHICLE

In a preferred embodiment, the vehicle 10 is operated in either a manual mode with the operator seated on the vehicle or in the remote control mode using the portable remote transmitter 160. In the manual mode, the operator controls functions from the control console 22 on the steering column 24 and drives the vehicle using the steering wheel 20 and the speed/brake pedal 19. To start the vehicle, the key is inserted in the key switch 32 and turned clockwise. The circuit breaker 200 underneath the seat is switched on to apply the operating power. When the manual mode is selected with switch 38, the indicator light 38a is on. The vehicle is steered in the same manner as an automobile. From the control console 22, the motion direction is selected by pressing the forward/reverse push button 36. The selected direction will be shown by the lighting of the indicator 36a "forward" or indicator 36b "reverse".

The speed of the vehicle is controlled by foot pressure on the pedal 19. When the pedal 19 is released, dynamic braking action slows the unit to a stop, and the emergency or parking brake is automatically set to prevent rolling. Release of the pedal 19 also lights the brake light 48 on the vehicle.

To operate the vehicle in the remote mode using the remote control transmitter of FIG. 8B, the remote control transmitter 250, the key is inserted in the key switch 32 at the control console 22 and turned clockwise. The circuit breaker 200 is then positioned to "on". The manual/remote push button 38 is pressed to set the remote mode which causes the remote indicator 38b to light. The user then presses the slow or fast buttons 246, 244 to cause the vehicle to move. The user presses the stop button 242 to stop the vehicle and the horn button 248 to sound the horn.

The shopping cart coupler assembly 28 is used in either the manual or remote control modes. To engage the cart coupler assembly to the shopping cart, the rear of the first shopping cart is positioned so that its vertical rear frame members 204 and 206 are against the coupler assembly as seen in FIG. 6. The shopping cart is slid sideways about 2 inches to cause its rear frame members to engage both coupler jaws 72 and 74. The locking pin 76 is pushed across the open portion 78 of jaw 72 to secure the shopping cart to the coupler assembly 28. As additional carts are collected, they are stacked to the cart secured to the cart coupler assembly 28. The operator guides the vehicle 10 with the remote control transmitter 250 by operating the slow or fast buttons 246, 244 and steering the head cart in the line. Stray carts are added to the front of the line as the collecting work proceeds through the parking lot. Due to the variable load compensation capabilities, the vehicle does not stall while adding more carts even while reaching the maximum. The vehicle of a preferred embodiment will push up to 75 carts in rain, snow, sleet and ice. While the operator distributes the carts inside the store, he or she advances the cart line through the door via the radio.

The vehicle 100 is preferably stored indoors in an area where it can be charged and service. The antenna pole 26 can be folded down when stored. Charging of the vehicle requires connecting the charging cable (not shown) to the charge outlet 208 on the vehicle and a source of 115 V AC. To avoid accumulation of explosive hydrogen gas from charging batteries, the vehicle should be in a well-ventilated area and the housing should be raised. A support rod is located in the chassis of 12 and is used to keep the hinged housing 14 raised as seen in FIG. 9. When the brake or drive assemblies need servicing, jack screws 60 and 62 are first extended to support the vehicle 10 and the upper housing 14 is then raised. The lock pin 106 is removed and the drive assembly is pivoted upward about bar 104 for servicing. Raising the upper housing 14 also gives access to the controller 184, the batteries 88, 90, 92, 94, 96 and 98 and the other components of the vehicle.

The vehicle also has an optional accessory to provide traction ballast. This consists of a bracket 226 secured to the rear of the device into which weights may be placed. Up to 250 pounds of additional weight may be added at the rear of the vehicle. A front bracket (not shown) may be used for adding weight at the front of the vehicle. Another optional feature is a hitch 230 located in the rear of the vehicle for towing small trailers. A waste container can be readily secured to the upper housing for receiving in trash found in the parking lot.

While this invention has been described in conjunction with the preferred embodiment thereof, various modifications and changes therein may be made by those skilled in the art to which it pertains without departing from the spirit and scope of this invention.

We claim:

1. A vehicle for moving shopping carts, comprising:
   (a) a chassis supported by at least two wheels;
   (b) a shopping cart coupler mounted to the chassis releasably attaching at least one shopping cart or a shopping cart train;
   (c) an electric motor supported by said chassis powering said vehicle in response to a drive signal;
   (d) a control panel having a mode selector selecting between a plurality of operational modes, including a manual mode and a remote mode;
   (e) at least one remote control device generating and transmitting an operator signal to operate the vehicle in the remote mode, the operator signal including a target speed value;
   (f) a manual control device generating and transmitting an operator signal and a stop signal to operate the vehicle in the manual mode;
   (g) a receiver on the vehicle communicating with the remote control device to operate the vehicle in the remote mode;
   (h) a controller on the vehicle controlling vehicle movement in response to the operator signal, said controller comprising:
      i. a signal receiver connected to the receiver, the signal receiver receiving the operator signal;
      ii. a motor switching circuit generating a motor interface signal in response to the operator signal;
      iii. a motor interface circuit receiving the motor interface signal from the motor switching circuit and generating a drive signal to power the motor;
      iv. a speed sensing circuit generating a present speed signal; and
      v. a speed regulating circuit coupled to the motor interface circuit, wherein the speed regulating circuit is operative to modify the drive signals in response to changes in the present speed signal such that the present speed signal approaches one of the at least one target speed, whereby the speed of the vehicle tends to be maintained substantially constant during the attachment and release of the one or more shopping carts or shopping cart trains coupled to the vehicle
   (i) a brake controller operative to drive the electric motor in an opposite direction in response to the stop signal.

2. The vehicle of claim 1, wherein the remote control device communicates with the signal receiver of the controller using a pulse code modulation system.

3. The vehicle of claim 2, wherein the pulse code modulation system comprises a carrier signal modulated with at least one digital command.

4. The vehicle of claim 3, wherein the at least one digital command further comprises a stop command for stopping the vehicle.

5. The vehicle of claim 3, wherein the at least one digital command further comprises a slow command for driving the vehicle at a speed approaching a first speed, and a fast command for driving the vehicle at a speed approaching a second speed, wherein the second speed is faster than the first speed.

6. The vehicle of claim 3, further comprising a horn, wherein the at least one digital command further comprises a horn command for enabling the horn on the vehicle.

7. The vehicle of claim 3, wherein the signal receiver comprises an identifier code and wherein the at least one digital command further comprises a security code matching the identifier code on the signal receiver.

8. The vehicle of claim 1, wherein the speed sensing circuit couples to a tachometer for receiving the present speed signal.

9. The vehicle of claim 8, wherein the tachometer further comprises:
   (a) a wheel mounted on an axis of the electric motor, said wheel comprising slits arranged in a circumference of a concentric line around said axis;
   (b) at least one light emitting diode (LED) positioned to direct light through the slits from one side of said wheel; and
   (c) at least one LED sensor located on the other side of said wheel positioned to receive light directed through the slits by the at least one LED as the wheel rotates around the axis.

10. The vehicle of claim 1, further comprising a speed limit filter for limiting the vehicle speed to a predetermined maximum speed.

11. The vehicle of claim 1, wherein the speed sensing circuit comprises a monostable vibrator triggered by the present speed signal, and the target speed defines a duty cycle for a set speed signal coupled to the motor interface circuit.

12. The vehicle of claim 11, further comprising a speed signal sensor for generating a control voltage level indicative of the target speed according to the duty cycle of the set speed signal, wherein the control voltage is coupled to the motor interface circuit.

13. The vehicle of claim 12, wherein the motor interface circuit comprises a pulse width modulation circuit operative to receive the control voltage level and to generated motor drive signals responsive to the control voltage level.

14. The vehicle of claim 1, wherein the at least one remote control device further comprises a variable drive control device for generating and transmitting a variable drive signal, the variable drive signal including a plurality of voltage levels, each indicative of a target speed.

15. The vehicle of claim 1, wherein the manual control device further comprises a variable drive control device for generating and transmitting a variable drive signal, the variable drive signal including a plurality of voltage levels, each indicative of a target speed.

16. The vehicle of claim 15, further comprising a seat; and wherein the variable drive control device comprises a foot-operated control pedal.

17. A vehicle adapted for moving at least one wheeled cart, comprising:
   (a) a chassis supported by at least two wheels;
   (b) a coupling system mounted to the chassis for releasably attaching at least one wheeled cart or a train of wheeled carts;
   (c) an electric motor supported by the chassis for powering the vehicle;

(d) a control panel having a mode selector for selecting one of a plurality of operational modes, including a manual mode and a remote mode;

(e) a manual control device generating and transmitting a move signal and a stop signal to operate the vehicle in the manual mode;

(f) a remote control device operating the vehicle in the remote mode, wherein the remote control device generates a radiant energy signal comprising one of a plurality of vehicle commands, including a stop command and at least one move command;

(g) a receiver on the vehicle receiving the radiant energy signal;

(h) a signal receiver coupled to the receiver receiving the radiant energy signal, the signal receiver operative to generate a stop signal in response to a stop command and a remote move signal in response to a move command, wherein the remote move signal includes a target speed value;

(i) a controller controlling the vehicle movement in response to a move signal or a remote move signal, wherein, when a remote move signal is received, the controller controls the power to the electric motor to move the vehicle at a speed substantially equal to the target speed value; and (j) a brake controller operative to drive the electric motor in an opposite direction in response to the stop signal.

18. The vehicle of claim 17, further comprising a parking brake controller operative to inhibit energy to a parking brake actuator to engage a parking brake, and operative to energize the parking brake actuator to release the parking brake.

19. The vehicle of claim 18, wherein the parking brake actuator comprises a solenoid coupled to a parking brake mechanism that brakes the vehicle by frictionally contacting a parking disc coupled to a drive shaft of the electric motor.

20. The vehicle of claim 18, wherein the parking brake controller operates the parking brake actuator using power modulation.

21. The vehicle of claim 17, wherein the remote control device communicates with the receiver using a pulse code modulation system.

22. The vehicle of claim 21, wherein the pulse code modulation system comprises a carrier signal modulated with at least one digital command.

23. The vehicle of claim 22, wherein the stop command comprises a digital command.

24. The vehicle of claim 22, wherein the at least one move command comprises a digital command and at least one move command includes a slow command for driving the vehicle at a speed approaching a first speed, and a fast command for driving the vehicle at a speed approaching a second speed, where the second speed is higher than the first speed.

25. The vehicle of claim 22, further comprising a horn, wherein the at least one digital command comprises a horn command for operating the horn on the vehicle.

26. The vehicle of claim 22, wherein the signal receiver comprises an identifier code and wherein the at least one digital command further comprises a security code matching the identifier code on the signal receiver.

27. A vehicle for moving shopping carts comprising:

(a) a chassis supported by at least two wheels;

(b) a device coupled to the chassis releasably connecting at least one shopping cart or a shopping cart train to the vehicle;

(c) an electric motor supported by said chassis powering said vehicle in response to a drive signal;

(d) a control panel having a mode selector selecting between a plurality of operational modes, including a manual mode and a remote mode;

(e) at least one remote control device generating and transmitting an operator signal to operate the vehicle in the remote mode, the operator signal including a target speed value;

(f) a manual control device generating and transmitting an operator signal and a stop signal to operate the vehicle in the manual mode;

(g) a receiver on the vehicle communicating with the remote control device to operate the vehicle in the remote mode; and (h) a controller on the vehicle controlling vehicle movement in response to the operator signal, said controller comprising:
  i. a signal receiver connected to the receiver, the signal receiver receiving the operator signal;
  ii. a motor switching circuit generating a motor interface signal in response to the operator signal;.
  iii. a motor interface circuit receiving the motor interface signal from the motor switching circuit and generating a drive signal to power the motor;
  iv. a speed sensing circuit generating a present speed signal; and
  v. a speed regulating circuit coupled to the motor interface circuit, wherein the speed regulating circuit is operative to modify the drive signals in response to changes in the present speed signal such that the present speed signal approaches one of the at least one target speed, whereby the speed of the vehicle tends to be maintained substantially constant during the attachment and release of the one or more shopping carts or shopping cart trains coupled to the vehicle (i) a brake controller operative to drive the electric motor in an opposite direction in response to the stop signal.

* * * * *